(12) United States Patent
Moughton et al.

(10) Patent No.: US 12,545,813 B2
(45) Date of Patent: Feb. 10, 2026

(54) ELECTRICALLY DEBONDABLE UV ACTIVATED ADHESIVES

(71) Applicant: 3M INNOVATIVE PROPERTIES COMPANY, St. Paul, MN (US)

(72) Inventors: Adam O. Moughton, Minneapolis, MN (US); Michael J. Maher, St. Paul, MN (US); Andrew Satrijo, St. Paul, MN (US); Jonathan E. Janoski, Woodbury, MN (US); Aaron T. Hedegaard, Woodbury, MN (US); Kathleen S. Shafer, Woodbury, MN (US); Kelly A. Volp, Minneapolis, MN (US); Michael K. Kennedy, Savage, MN (US); Ramesh C. Lhila, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 121 days.

(21) Appl. No.: 18/631,645

(22) Filed: Apr. 10, 2024

(65) Prior Publication Data
US 2024/0263044 A1 Aug. 8, 2024

Related U.S. Application Data

(63) Continuation-in-part of application No. PCT/IB2023/058862, filed on Sep. 7, 2023.
(Continued)

(51) Int. Cl.
*C09J 7/30* (2018.01)
*B32B 7/06* (2019.01)
(Continued)

(52) U.S. Cl.
CPC .................. *C09J 7/30* (2018.01); *B32B 7/06* (2013.01); *B32B 7/12* (2013.01); *B32B 15/082* (2013.01);
(Continued)

(58) Field of Classification Search
CPC ... B32B 15/08; B32B 15/082; B32B 2457/20; B32B 7/06; B32B 7/12; C09J 2203/326;
(Continued)

(56) References Cited

U.S. PATENT DOCUMENTS

| 4,737,593 A | 4/1988 | Ellrich et al. |
| 6,627,384 B1 | 9/2003 | Kim et al. |

(Continued)

FOREIGN PATENT DOCUMENTS

| EP | 4332144 A1 † | 3/2024 |
| WO | 2016094277 A1 | 6/2016 |

(Continued)

OTHER PUBLICATIONS

Bisomer-PEA-6, GEO Specialty Chemicals, Jan. 2024, 2 pages.
(Continued)

*Primary Examiner* — Sonya M Sengupta
(74) *Attorney, Agent, or Firm* — Carolyn A. Fischer

(57) ABSTRACT

Curable and cured compositions as well as articles containing the curable or cured compositions are provided. The cured compositions are typically a semi-structural or structural adhesive. Advantageously, the cured compositions can be removed (e.g., de-bonded) from the various surfaces of the articles after the useful lifetime of the articles, to correct misplacement of a part during manufacturing, or to repair the electronic device. The separation step occurs using a direct current electric potential across the cured composition.

20 Claims, 3 Drawing Sheets

Related U.S. Application Data

(60) Provisional application No. 63/378,923, filed on Oct. 10, 2022.

(51) Int. Cl.
| | |
|---|---|
| *B32B 7/12* | (2006.01) |
| *B32B 15/082* | (2006.01) |
| *C08K 5/19* | (2006.01) |
| *C08K 5/3415* | (2006.01) |
| *C08K 5/3432* | (2006.01) |
| *C08K 5/3445* | (2006.01) |
| *C08K 5/36* | (2006.01) |
| *C08L 51/00* | (2006.01) |

(52) U.S. Cl.
CPC .............. *C08K 5/19* (2013.01); *C08K 5/3415* (2013.01); *C08K 5/3432* (2013.01); *C08K 5/3445* (2013.01); *C08K 5/36* (2013.01); *C08L 51/006* (2013.01); *C08K 2201/001* (2013.01); *C08L 2203/20* (2013.01); *C09J 2301/408* (2020.08); *C09J 2301/502* (2020.08); *C09J 2400/163* (2013.01); *C09J 2453/00* (2013.01)

(58) Field of Classification Search
CPC ............ C09J 2301/408; C09J 2301/502; C09J 2400/163; C09J 2433/00; C09J 2453/00; C09J 2463/00; C09J 4/06; C09J 5/00; C09J 7/30; C08F 220/1804; C08F 220/20; C08F 265/06; C08F 287/00; C08K 2201/001; C08K 3/16; C08K 5/19; C08K 5/3415; C08K 5/3432; C08K 5/3445; C08K 5/36; C08L 2203/20; C08L 51/006; C08L 63/00

See application file for complete search history.

(56) References Cited

U.S. PATENT DOCUMENTS

| | | |
|---|---|---|
| 6,734,256 B1 | 5/2004 | Everaerts et al. |
| 6,806,320 B2 | 10/2004 | Everaerts et al. |
| 7,255,920 B2 | 8/2007 | Everaerts et al. |
| 10,400,055 B2 | 9/2019 | Griesgraber et al. |
| 10,640,686 B2 | 5/2020 | Roscoe et al. |
| 10,913,807 B2 | 2/2021 | Yurt et al. |
| 2002/0182955 A1 | 12/2002 | Weglewski et al. |
| 2021/0095097 A1 | 4/2021 | Lewandowski et al. |
| 2022/0411673 A1 † | 12/2022 | Stapf |
| 2023/0416574 A1 | 12/2023 | Maher et al. |
| 2024/0263044 A1 * | 8/2024 | Moughton ................. C09J 4/06 |

FOREIGN PATENT DOCUMENTS

| | | |
|---|---|---|
| WO | 2021115772 A1 | 6/2021 |
| WO | 2021177197 A1 | 9/2021 |
| WO | 2022043784 A1 | 3/2022 |
| WO | 2022144734 A1 | 7/2022 |
| WO | 2023275640 A1 | 1/2023 |
| WO | 2023037185 A1 | 3/2023 |
| WO | 2024003636 A1 | 1/2024 |

OTHER PUBLICATIONS

Bisomer-PEM-63-P-HD, GEO Specialty Chemicals, May 2021, 2 pages.

Clearstrength® XT100, High Performance Toughening Agent for Thermosetting Resins, Arkema, 2019, 3 pages.

International Search Report for PCT International Application No. PCT/IB2023/058862, mailed on Dec. 12, 2023, 3 pages.

Ishimoto, "Biobased Polymers: Synthesis of Graft Copolymers and Comb Polymers Using Lactic Acid Macromonomer and Properties of the Product Polymers", Biomacromolecules, Sep. 2012, vol. 13, No. 11, pp. 3757-3768.

* cited by examiner
† cited by third party

ELECTRICALLY DEBONDABLE UV ACTIVATED ADHESIVES

BACKGROUND

New adhesives are needed in for use in the preparation of electronic devices and in various industrial applications. For example, in electronic devices, particularly mobile electronic devices (e.g., hand-held, or wearable electronic devices), various adhesives such as pressure-sensitive adhesives are used to bond the cover glass (or lens) to the underlying display module, bond the touch sensor to the cover glass and display, or bond the lower components of the display to the housing. The selected adhesive typically should have sufficiently high adhesive strength to properly maintain good adhesion to those components, not only when the mobile electronic devices are operating tinder normal conditions, but also when they are subjected to traumatic forces (e.g., when impacted and/or dropped onto a hard surface).

Further, new adhesives are needed for electronic devices that can perform well during the lifetime of the devices but that can be removed (e.g., de-bonded) from the electronic components after the useful lifetime of the device or to repair the device to extend its useful lifetime. The removal of the adhesives is preferably clean so that the electronic components can be reused or recycled, or so that the electronic device can be repaired.

SUMMARY

Curable and cured compositions as well as articles containing the curable and cured compositions are provided. The curable composition typically functions like a pressure-sensitive adhesive (due to the film forming polymeric material) while the cured composition is typically a semi-structural or structural adhesive.

The cured compositions can be used in various articles to attach one surface to another in the electronics, transportation, and construction industries. For example, the cured composition can be used in mobile electronic devices where impact and/or drop resistance of bonded parts is desirable or in various articles where one component is glass, and another component is attached to the glass surface.

Advantageously, the cured compositions can be removed (e.g., de-bonded) from the various surfaces of the articles after the useful lifetime of the articles, to correct misplacement of a part during manufacturing, or to repair the electronic device. For example, the cured compositions can be removed allowing the various components that were adhered together to be reused in the manufacture of new articles or to correct manufacturing errors. This can be of great value to the manufacturers of electronic devices because it allows the reusing of costly electronic components. Additionally, the end-of-life recyclability can be improved for the situation where dissimilar materials are desirably separated into different waste streams.

In a first aspect, a curable composition is provided. The curable composition contains a film forming polymeric material such as a (meth)acrylic-based multiblock copolymer, a statistical (meth)acrylic-based copolymer, or a combination thereof; an epoxy resin, a photoacid generator, and an ionic liquid that has a melting point less than 100 degrees Celsius and that has an anion selected from $SbF_6^-$, $PF_6^-$, or a mixture thereof.

In a second aspect, a first article is provided. The first article contains (a) a curable composition as described above in the first aspect and (b) either a first substrate or a first release liner positioned adjacent to a first surface of the curable composition.

In a third aspect, a cured composition is provided. The cured composition is a reaction product of the curable composition described in the first aspect.

In a fourth aspect, a second article is provided. The second article contains (a) a first substrate, (b) a second substrate, and (c) a cured composition of the third aspect positioned between the first substrate and the second substrate, wherein the cured composition bonds the first substrate to the second substrate.

In a fifth aspect, a method is provided for making the second article described in the fourth aspect. The method includes preparing a curable composition as described above in the first aspect, wherein the curable composition has a first surface that is positioned adjacent to a release liner. The method still further includes positioning a second substrate adjacent to a second surface of the curable composition that is opposite the first surface. The method further includes removing the release liner from the first surface of the curable composition. The method still further includes exposing the layer of the curable composition to ultraviolet radiation. The method yet further includes positioning a first substrate adjacent to the layer of the curable composition opposite the second substrate and curing the curable layer to bond the first substrate to the second substrate. In some embodiments, at least one of the first substrate or the second substrate is electrically conductive.

In a sixth aspect, a method is provided for separating the second article described in the fourth aspect. The method includes applying a direct current electric potential across the cured composition to separate the first substrate from the second substrate. Preferably, at least one of the first substrate or the second substrate is electrically conductive.

The terms "a", "an", and "the" are used interchangeably with "at least one" to mean one or more of the elements being described. The phrases "at least one of" and "comprises at least one of" followed by a list refers to any one of the items in the list and any combination of two or more items in the list.

The term "and/or" means either or both. For example, the expression X and/or Y means X, Y, or a combination thereof (both X and Y).

The term "curable" refers to a composition or component that can be cured. The terms "cured" and "cure" refer to joining polymer chains together by covalent chemical bonds to form a polymeric network. A cured polymeric network is generally characterized by insolubility, but it may be swellable in the presence of an appropriate solvent.

The term "resin components" as used herein refers to the curable composition minus any inorganic material that may be present. As used herein, the resin components include, but are not limited to, a (meth)acrylic-based multiblock copolymer, a statistical (meth)acrylic-based copolymer, a syrup composition containing a polymeric material dissolved in various monomers, a poly(alkylene oxide) (meth)acrylate, monomers, an epoxy resin, a polyol, a photoacid generator, and an ionic liquid that is fluid below 100 degrees Celsius.

The term "curable composition" refers to a total reaction mixture that is subjected to curing. The curable composition includes the resin components and any optional inorganic materials. The term "cured composition" refers to the cured reaction product of the curable composition.

The term "polymerizable component" refers to a compound that can undergo free radical polymerization (i.e., the compound has a polymerizable group). The polymerizable component typically has an ethylenically unsaturated group such as a (meth)acryloyl-containing group or a vinyl group that is the polymerizable group. The polymerizable component can be referred to interchangeably as a "monomer". The term "macromer" refers to a monomer having a polymeric group such as a polyether group (i.e., macromers are a subset of monomers).

The term "polymerizable composition" refers to the reaction mixture that can be polymerized by free radical polymerization. It includes the polymerizable components (i.e., monomers including macromers) plus any other material such as a free radical initiator, chain transfer agent, antioxidant, solvent, and the like that may be included in the reaction mixture.

The term "(meth)acryloyl" refers to a group of formula $CH_2=CR-(C=O)-$ where R is hydrogen (for an acryloyl group) or methyl (for a methacryloyl group).

The term "(meth)acrylate" refers to a methacrylate and/or acrylate. Likewise, the term (meth)acrylic acid" refers to methacrylic acid and/or acrylic acid and the term "(meth) acrylamide" refers to methacrylamide and/or acrylamide.

The term "(meth)acrylic" refers to a compound having a (meth)acryloyl group of formula $H_2C=CR-(CO)-$ where R is hydrogen or methyl. The compounds can be monomers including macromers or polymers.

The term "(meth)acrylic-based" refers to a polymer if formed from at least 50 weight percent (meth)acrylic-containing monomers based on the total weight of monomers. In some embodiments, the (meth)acrylic-based polymer of formed from at least 60, at least 70, at least 80, at least 90, at least 95, at least 97, at least 98, at least 99, or even 100 weight percent (meth)acrylic-containing monomers.

The term "monomeric unit" refers to the reaction product of a polymerizable component (i.e., a monomer (including a macromer)) within the polymeric material. As an example, the monomeric unit of acrylic acid ($H_2=CH-(C=O)-OH$) is

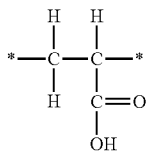

where the asterisks (*) indicate the attachment site to another group such as another monomeric unit in the polymer.

The term "poly(alkylene oxide) group" refers to a group having a plurality of alkylene oxide units. The alkylene oxide units are typically selected from ethylene oxide, propylene oxide, tetrahydrofuran oxide, or mixtures thereof.

The term "polymer" and "polymeric material" refer to homopolymers, copolymers, terpolymers, and the like. As used herein, the term "copolymer" is used herein to refer to any polymer prepared from two or more different monomers.

The term "statistical" in reference to a (meth)acrylic-based copolymer refers to a copolymer that is formed from a polymerizable composition having a plurality of different types of monomers. Under some conditions, the statistical (meth)acrylic-based copolymer is a random copolymer. Under other conditions, however, the (meth)acrylate copolymer may not be completely random because differences in concentration and reactivity of the monomers may create conditions where the early stages of polymerization may favor polymerization of one type of monomer in the polymerizable composition. The terms "statistical" and "random" are often used interchangeably in polymeric publications. If the term "block" or "multi-block" does not appear in the description (i.e., name) of the copolymer, it is presumed to be a statistical copolymer.

The term "glass transition temperature", which can be abbreviated "$T_g$," refers to the temperature at which a polymeric material transitions between being in a glassy state to being in a molten or rubbery state. The test is often performed using a rheometer as described in the Example section.

As used herein, the term "semi-structural adhesive" refers to those cured compositions that have an overlap shear strength of at least 0.60 or at least 0.75 megaPascals (MPa). More preferably, the overlap shear strength is at least 1.0 or at least 1.5 MPa. Those cured compositions having a particularly high overlap shear strength, however, are referred to herein as "structural adhesives". Structural adhesives are those cured compositions that have an overlap shear strength of at least 3.5, at least, at least 4, at least 5, at least 6, or at least 7 MPa.

As used herein, any statement of a range includes the endpoint of the range and all suitable values within the range (e.g., 1 to 5 includes 1, 1.5, 2, 2.75, 3, 3.80, 4, 5, etc.).

As used herein, the term "room temperature" refers to a temperature of 20 to 30 degrees Celsius such as 20 to 25, 22 to 25, or 23 degrees Celsius.

The term "in the range" or "within a range" (and similar statements) includes the endpoints of the stated range.

DETAILED DESCRIPTION

Figure 1A:
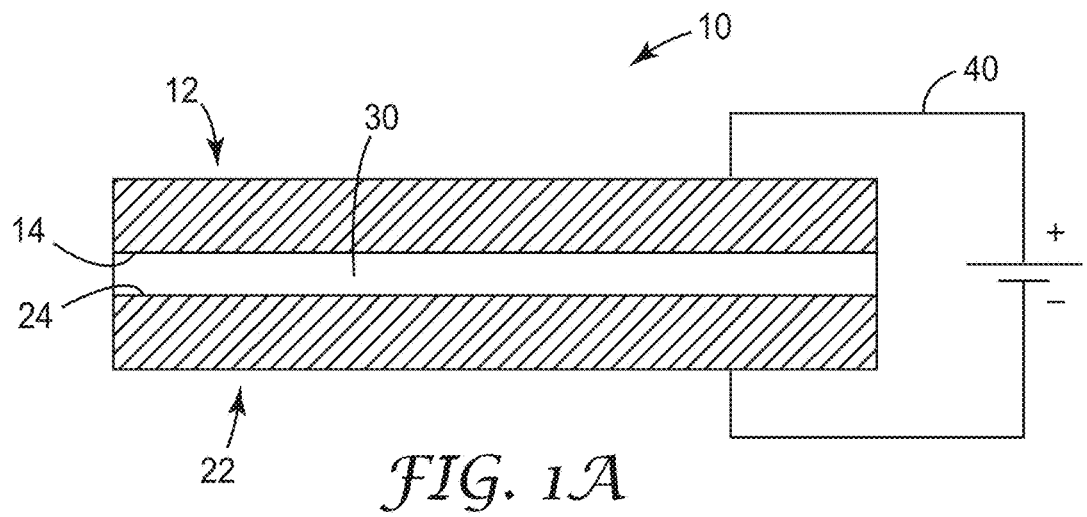
FIG. 1A is a schematic side view of one exemplary article of the present application.

A curable composition is provided that can be cured to form a cured composition that is suitable for use in electronic devices and in various industrial applications. The curable composition typically functions like a pressure-sensitive adhesive while the cured composition is typically a semi-structural or structural adhesive. The cured composition can be formed by exposure of the curable composition to ultraviolet radiation.

The cured composition tends to have sufficient tensile strength and shear impact resistance for use in applications where impact and drop resistance are desirable. Another desirable characteristic of the cured composition is that it can be separated from (e.g., de-bonded from) substrates (e.g., components of an article) to which it is attached by applying a direct current electric potential. This characteristic allows, for example, the reusing of costly components in new articles, the repairing of the articles, and/or recycling various components that were previously bonded together.

Curable Composition

A curable composition is provided that can be cured by exposure to ultraviolet radiation to form a cured composition that is typically positioned between and adhere to two different substrates. The cured composition can be de-bonded later from one or both substrates using a direct current electric potential if at least one of the substrates is or can be made to be electrically conductive. The curable composition typically contains a film forming polymeric material, an epoxy resin, a photoactive generator, and an ionic liquid.

The film forming polymeric material alone or together with the uncured epoxy resin and optional components (e.g. polyol, when present) has a glass transition temperature (Tg) no greater than 20 degrees Celsius. For example, the glass transition temperature is often no greater than 15 degrees Celsius, no greater than 10 degrees Celsius, no greater than 5 degrees Celsius, or no greater than 0 degrees Celsius.

In some embodiments of the curable composition, the film forming polymeric material comprises a (meth)acrylic-based block copolymer, a statistical(meth)acrylic-based copolymer, or a combination thereof.

In some embodiments of the curable composition, the film forming polymeric material includes two different (meth)acrylic-based polymeric materials such as a (meth)acrylic-based multiblock copolymer and a statistical (meth)acrylic-based copolymer. In such embodiments, the curable composition curable composition often contains (a) a (meth)acrylic-based multiblock copolymer, (b) a statistical (meth)acrylic-based copolymer, (c) an epoxy resin, (d) a photoactive generator, and (e) an ionic liquid. The statistical (meth)acrylic-based copolymer is often formed in the presence of the (meth)acrylic-based multiblock copolymer but can be formed in the presence of other materials in the curable composition as well. Each component of the curable composition is described further below.

(Meth)Acrylic-Based Multiblock Copolymer

In some embodiments, the curable composition includes a (meth)acrylic-based multiblock copolymer. The term "multiblock copolymer" refers to a copolymer having a plurality of different polymeric segments, which are known as "blocks". Each block can be a homopolymer (i.e., a polymeric segment formed from a single type of monomer) or a copolymer (i.e., a polymeric segment formed from multiple (i.e., two or more) different types of monomers). The boundary between adjacent blocks in the block copolymer can be sharp (i.e., the composition of the monomeric units changes abruptly at the boundary between two blocks) or tapered (i.e., the composition of the monomeric units does not change abruptly at the boundary between two blocks but is mixed in a transition region near the boundary; the transition region contains monomeric units from both adjacent blocks).

The term "triblock copolymer" refers to a multi-block copolymer having three different polymeric blocks and the term "diblock copolymer" refers to a multi-block copolymer having two different polymeric blocks. Both the triblock copolymer and the diblock copolymer contain polymeric blocks arranged in a linear manner relative to each other. Stated differently, the diblock copolymers and triblock copolymers are not star copolymers, graft copolymers, comb copolymers, dendrimers, or other macromolecules having substantially nonlinear architectures.

In most embodiments, the (meth)acrylic-based multiblock copolymer is a triblock copolymer. However, in some embodiments, the curable composition contains both a triblock copolymer and a diblock copolymer. The multiblock copolymer is usually formed predominately from (meth) acrylic-based monomers having a group $H_2C=CR—(CO)—$ where R is hydrogen or methyl. The (meth)acrylic-based monomers include (meth)acrylate monomers, (meth)acrylic acid monomers, (meth)acrylamide monomers, and mixtures thereof. Usually, at least 80 weight percent or more of the monomeric units in the multiblock copolymer are from (meth)acrylic-based monomers. For example, at least 85, at least 90, at least 95, at least 97, at least 98, at least 99, or 100 weight percent of the monomers used to form the (meth)acrylic-based multiblock copolymer are (meth)acrylic-based monomers. In some embodiments, the monomers are all (meth)acrylate monomers.

The triblock typically has an A-B-A structure with the A and B blocks selected to have solubility parameters that are sufficiently different to cause phase separation between the A blocks and the B block. To create the phase separation, the two A blocks and the B block of the (meth)acrylic-based triblock copolymer A-B-A are typically selected to have different glass transition temperatures. The A blocks, which typically have a higher glass transition temperature than the B, can be referred to as "hard" blocks while the B block can be referred to as a "soft" block. The A blocks are usually selected to be more rigid than the B block. The A blocks can be thermoplastic and can provide semi-structural or structural strength and/or shear strength to the adhesive composition. The B block can be a viscous material and can provide tack and adhesive strength to the adhesive composition.

The A blocks of the (meth)acrylic-based triblock copolymer A-B-A are typically selected to have a glass transition temperature ($T_g$) equal to at least 50° C. as measured using Dynamic Mechanical Analysis. In some embodiments, the glass transition temperature is at least 60° C., at least 70° C., at least 75° C., at least 80° C., at least 90° C., or at least 100° C. The glass transition temperature can be up to 200° C., up to 190° C., up to 180° C., up to 175° C., up to 170° C., up to 160° C., up to 150° C., up to 140° C., up to 130° C., up to 125° C., up to 120° C., up to 110° C., or up to 100° C. Exemplary ranges of glass transition temperatures of the A blocks include 50 to 200° C., 75 to 200° C., 70 to 175° C., 75 to 150° C., or 80 to 140° C.

The B block of the (meth)acrylic-based triblock copolymer A-B-A is a viscous segment and is typically selected to have a glass transition temperature no greater than 20° C. as measured using Dynamic Mechanical Analysis. In some embodiments, the glass transition temperature is no greater than 10° C., no greater than 5° C., no greater than 0° C., no greater than –10° C., no greater than –20° C., or no greater than –30° C. The glass transition temperature is often at least –70° C., at least –60° C., at least –50° C., at least –40° C., or at least –30° C. depending on the composition of monomers used to form the B block. Exemplary ranges for the glass transition temperature of the B block include –70 to 20° C., –70 to 10° C., –70° C. to 0° C., –50 to 0° C., –70 to –10° C., –50 to –10° C., –70 to –20° C., –50 to –20° C., –70 to –30° C., or –50 to –30° C.

The (meth)acrylic-based triblock copolymer A-B-A has two polymeric A blocks and one polymeric B block. Each of these blocks can be a homopolymer or a copolymer (e.g., a statistical copolymer). The (meth)acrylic-based triblock copolymer A-B-A usually contains 10 to 55 weight percent A blocks and 45 to 90 weight percent B blocks based on a total weight of the (meth)acrylic-based triblock copolymer. The (meth)acrylic-based triblock copolymer contains at least 10, at least 20, at least 25, at least 30, or at least 35 weight percent and up to 55, up to 50, up to 45, up to 40, or up to 35 weight percent A block based on the total weight of the (meth)acrylic-based triblock copolymer. The (meth) acrylic-based triblock copolymer contains at least 45, at least 50, at least 55, or at least 60 weight percent and up to 90, up to 80, up to 75, up to 70, up to 65, or up to 60 weight percent of the B block based on the total weight of the (meth)acrylic-based triblock copolymer. Together, the weight percent of the A blocks and the weight percent of the B block is nearly 100 weight percent based on the total weight of the (meth) acrylic-based triblock copolymer (i.e., there can be a small amount of initiator residue present as well). In some examples, the (meth)acrylic-based block copolymer contains 15 to 55 weight percent A blocks and 45 to 85 weight percent B block, 15 to 40 weight percent A block and 60 to 85 weight percent B block, 20 to 55 weight percent A blocks and 45 to 80 weight percent B block, 20 to 40 weight percent A block and 60 to 80 weight percent B block, or 20 to 35 weight percent A block and 65 to 80 weight percent B block.

Each of the two A blocks of the (meth)acrylic-based triblock copolymer A-B-A can be about the same molecular weight. That is, the weight ratio of the two A blocks of the (meth)acrylic-based triblock copolymer is often 1:1 or close to 1:1 such as greater than 0.9:1. However, other weight ratios can also be used such as in a range of 0.65:1 to 0.99:1. In many cases, the weight ratio of the two A blocks of the (meth)acrylic-based triblock copolymer is no lower than 0.65:1, 0.7:1, 0.75:1, 0.8:1, 0.85:1, 0.9:1, 0.95:1, 0.98:1, or 0.99:1.

Each A block of the (meth)acrylic-based triblock copolymer A-B-A is usually prepared from a monomer composition that includes an alkyl methacrylate. Suitable alkyl methacrylates for preparing the A blocks often have an alkyl group with 1 to 10 carbon atoms, 1 to 8 carbon atoms, 1 to 6 carbon atoms, 1 to 5 carbon atoms, or 1 to 4 carbon atoms. If the alkyl group has 3 to 5 carbon atoms, it is typically branched. If the alkyl group has 6 to 10 carbon atoms, it is typically cyclic or bicyclic.

Example alkyl methacrylates include methyl methacrylate, ethyl methacrylate, isopropyl methacrylate, isobutyl methacrylate, sec-butyl methacrylate, tert-butyl methacrylate, cyclohexyl methacrylate, methylcyclohexyl methacrylate, 3,3,5-trimethylcyclohexyl methacrylate, and isobornyl methacrylate. These monomers, when polymerized as a homopolymer, have a glass transition temperature equal to at least 50° C.

In some instances, the A blocks are homopolymers and each homopolymer is a poly(alkyl methacrylate). Example poly(alkyl methacrylates) include poly(methyl methacrylate), poly(ethyl methacrylate), poly(isopropyl methacrylate), poly(isobutyl methacrylate), poly(sec-butyl methacrylate), poly(tert-butyl methacrylate), poly(cyclohexyl methacrylate), poly(methylcyclohexyl methacrylate), poly (3,3,5-trimethylcyclohexyl methacrylate), and poly(isobornyl methacrylate).

In addition to the alkyl methacrylate monomers, the first monomer composition used to form the first A block can include other optional monomers provided the resulting polymeric blocks have a glass transition temperature that is equal to at least 50° C. when measured using Dynamic Mechanical Analysis. In some embodiments, the first monomer composition can include other (meth)acrylic-based monomers such as alkoxy substituted alkyl methacrylates, aryl methacrylates, aralkyl methacrylates, aryloxy substituted alkyl methacrylate, cyclic alkyl acrylates having a cyclic group with 6 to 10 carbon atoms, bicyclic alkyl acrylates having a bicyclic alkyl group with at least 8 carbon atoms, or a mixture thereof. Suitable alkoxy substituted alkyl methacrylates often have an alkyl group with 1 to 4 carbon atoms and an alkoxy group with 1 to 4 carbon atoms. An example is 2-methoxyethyl methacrylate. Suitable aryl methacrylates typically have an aryl group with 6 to 10 carbon atoms. An example aryl methacrylate is phenyl methacrylate. Suitable aralkyl methacrylates typically have aralkyl groups with 7 to 10 carbon atoms. An example aralkyl methacrylate is benzyl methacrylate. Suitable aryloxy-substituted alkyl methacrylates often have an aryloxy-substituted alkyl group with 7 to 10 carbon atoms. An example aryloxy-substituted alkyl methacrylate is 2-phenoxyethyl methacrylate. An example cyclic alkyl acrylate is cyclohexyl acrylate and an example bicyclic acrylate is isobornyl acrylate.

In still other embodiments, the first monomer composition used to form the A blocks can include various optional (meth)acrylic-based polar monomers provided the glass transition temperature of each resulting block is equal to at least 50° C. If present, these polar monomers are usually present in an amount no greater than 10, no greater than 5, no greater than 2, or no greater than 1 weight percent based on a total weight of the monomers in the respective monomer composition. Suitable polar monomers include, for example, a hydroxy group or a glycidyl group. Typically, acidic monomers and nitrogen-containing monomers are not selected (e.g., the first monomer composition is often free of such monomers). Specific monomers include, but are not limited to, hydroxy alkyl (meth)acrylates such as 2-hydroxyethyl (meth)acrylate as 2-hydroxypropyl (meth)acrylate, as well as glycidyl (meth)acrylate. In many embodiments, however, there are no polar monomers in the A blocks.

In other embodiments, the first monomer composition used to form the A blocks can include other optional monomers that are not (meth)acrylic-based monomers provided that greater than 80 weight percent of the monomers in the block are (meth)acrylic-based monomers and provided that the resulting polymeric blocks have a glass transition temperature that is equal to at least 50° C. when measured using Dynamic Mechanical Analysis. Examples of these other monomers are vinyl monomers such as styrene, styrene-type monomers (e.g., alpha-methyl styrene, 3-methyl styrene, 4-methyl styrene, ethyl styrene, isopropyl styrene, tert-butyl styrene, dimethyl styrene, 2,4,6-trimethyl styrene, and 4-methoxy styrene), and vinyl acetate.

The A blocks of the (meth)acrylic-based triblock copolymer are often a homopolymer formed from an alkyl methacrylate and the resulting polymeric block has a glass transition temperature equal to at least 50° C. as measured using Dynamic Mechanical Analysis. In some specific embodiments, both A blocks are the same homopolymer, which is a poly(alkyl methacrylate). In some more specific embodiments, the A blocks are poly(methyl methacrylate). In some embodiments, the (meth)acrylic triblock copolymer comprises at least 15, 20, 15, 35, or 40 wt. % poly(methyl methacrylate). In some embodiments, the (meth)acrylic triblock copolymer comprises no greater than 50, 45, 40, 35, 30, 25, or 20 wt. % poly(methyl methacrylate).

The B block of the (meth)acrylic-based triblock copolymer A-B-A is typically formed from monomers that will provide polymeric blocks having a glass transition temperature no greater than 20° C. as measured using Dynamic Mechanical Analysis. The B block is often prepared from a monomer composition that includes an alkyl acrylate. Stated differently, the B block is a polymeric material formed from a second monomer composition that includes an alkyl acrylate. Suitable alkyl acrylates for forming the B block often have an alkyl group with 1 or 2 to 20, 1 or 2 to 18, 1 or 2 to 12, or for 2 to 10 carbon atoms. The alkyl group can be linear, branched, cyclic, or a combination thereof (e.g., the alkyl can have a cyclic group plus a branched or linear group).

Specific examples of alkyl acrylate monomers that can be used to form the B block include, but are not limited to, methyl acrylate, ethyl acrylate, n-propyl acrylate, n-butyl acrylate, isobutyl acrylate, sec-butyl acrylate, n-pentyl acrylate, isoamyl acrylate, n-hexyl acrylate, 2-methylbutyl acrylate, 4-methyl-2-pentyl acrylate, cyclohexyl acrylate, 2-methylhexyl acrylate, n-octyl acrylate, 2-octyl acrylate, isooctyl acrylate, 2-ethylhexyl acrylate, isononyl acrylate, n-decyl acrylate, isodecyl acrylate, lauryl acrylate, isotridecyl acrylate, isostearyl acrylate, and octadecyl acrylate. Many of these monomers, when polymerized to form a homopolymer, have a glass transition temperature no greater than 20° C. when measured using Dynamic Mechanical Analysis.

In some instances, the B block is a homopolymer. Examples of homopolymers include, but are not limited to, poly(meth)acrylate, poly(ethyl acrylate), poly(n-propyl acrylate), poly(n-butyl acrylate), poly(isobutyl acrylate), poly(sec-butyl acrylate), poly(isoamyl acrylate), poly(n-hexyl acrylate), poly(2-methylbutyl acrylate), poly(4-methyl-2-pentyl acrylate), poly(cyclohexyl acrylate), poly (2-methylhexyl acrylate), poly(n-octyl acrylate), poly(2-octyl acrylate), poly(isooctyl acrylate), poly(2-ethylhexyl acrylate), poly(isononyl acrylate), poly(n-decyl acrylate), poly(isodecyl acrylate), poly(lauryl acrylate), poly(isotridecyl acrylate), poly(isostearyl acrylate), and poly(octadecyl acrylate). In some more specific instances, the B block is poly(n-butyl acrylate), poly(n-octyl acrylate), poly(2-octyl acrylate), poly(isooctyl acrylate), poly(2-ethylhexyl acrylate), or poly(isononyl acrylate). In some even more specific instances, the B block is poly(n-butyl acrylate). In another more specific embodiment, the B block is a copolymer of poly(2-ethylhexyl acrylate) and methyl acrylate.

In addition to the alkyl acrylate monomers, the second monomer composition used to form the B block can further include optional monomers provided the resulting polymeric blocks has a glass transition temperature that is no greater than 20° C. when measured using Dynamic Mechanical Analysis.

In some embodiments, the second monomer composition used to form the B block can optionally include a heteroalkyl (meth)acrylate, an aralkyl acrylate, an aryloxy substituted alkyl acrylate, or an alkyl methacrylate having an alkyl group that is linear or branched with at least 6 carbon atoms. Suitable heteroalkyl acrylates include, but are not limited to 2-ethoxy ethyl (meth)acrylate, 2-methoxy ethyl acrylate, and 2-(2-ethoxyethoxy)ethyl acrylate. Suitable aralkyl acrylates include, but are not limited to, 2-biphenylhexyl acrylate and benzyl acrylate. An example aryloxy substituted alkyl acrylate is 2-phenoxy ethyl acrylate. Suitable alkyl methacrylates are n-decyl methacrylate, lauryl methacrylate, n-octyl methacrylate, isooctyl methacrylate, 2-ethylhexyl methacrylate, and n-hexyl methacrylate.

In still other embodiments, the second monomer composition used to form the B block can include various (meth) acrylic-based polar monomers provided the glass transition temperature of these blocks is no greater than 20° C. when measured using Dynamic Mechanical Analysis. If present, these polar monomers are usually present in an amount no greater than 10, no greater than 5, no greater than 2, or no greater than 1 weight percent based on a total weight of the monomers in the respective monomer composition. Suitable polar monomers include, for example, a hydroxy-substituted alkyl (meth)acrylate. The polar monomer is typically not an acidic monomer or a nitrogen containing monomer (e.g., the second monomer composition is often free of such monomers). Specific polar monomers include, but are not limited to, (meth)acrylic acid, 2-hydroxyethyl (meth)acrylate, and 2-hydroxypropyl (meth)acrylate. In many embodiments, however, there are no polar monomers in the B block.

The B block of the (meth)acrylic-based triblock copolymer is often a homopolymer formed from an alkyl acrylate and the resulting polymeric block has a glass transition temperature no greater than 20° C. as measured using Dynamic Mechanical Analysis. In some specific embodiments, the B block is a poly(alkyl acrylate). In some more specific embodiments, the B block is poly(n-butyl acrylate), poly(n-octyl acrylate), poly(2-octyl acrylate), poly(isooctyl acrylate), poly(2-ethylhexyl acrylate), or poly(isononyl acrylate).

In some (meth)acrylic-based triblock copolymers, each A block comprises monomeric units derived from methyl methacrylate and the B block comprises monomeric units derived from n-butyl (meth)acrylate such as n-butyl acrylate.

The (meth)acrylic-based triblock copolymer A-B-A often has a weight average molecular weight ($M_w$) that is at least 25, at least 30, at least 35, at least 40, at least 45, or at least 50 kiloDaltons (kDa) and up to 200, up to 190, up to 180, up to 175, up to 170, up to 160, up to 150, up to 140, up to 130, up to 125, up to 120, up to 115, up to 110, up to 100, up to 90, up to 80, or up to 75 kDa. The weight average molecular weight is often in a range of 50 to 200, 50 to 175, or 50 to 150 kDa. The weight average molecular weight is typically determined using gel permeation chromatography with polystyrene standards.

The (meth)acrylic-based triblock copolymer can be synthesized using any suitable technique. Suitable techniques can include, for example, anionic polymerization, radical polymerization, group transfer polymerization, and ring-opening polymerization reactions. The polymerization can be a "living" or "controlled/living" polymerization, which can advantageously produce block copolymer structures that are well defined. Specific synthesis methods include atom transfer radical polymerization (ATRP) and reversible addition-fragmentation chain transfer polymerization (RAFT) processes. Such processes are disclosed, for example, in U.S. Pat. No. 7,255,920 (Everaerts et al.), U.S. Pat. No. 6,734,256 (Everaerts et al.), and U.S. Pat. No. 6,806,320 (Everaerts et al.). Other synthesis methods include the use of controlled radical initiators that are bis-dithiocarbamate or bis-dithiocarbonate compounds such as those disclosed in U.S. Pat. No. 10,400,055 (Griesgraber et al.), U.S. Pat. No. 10,640,686 (Roscoe et al.), and U.S. Pat. No. 10,913,807 (Yurt et al.) as well as U.S. Patent Application Publication 2021/0095097 (Lewandowski et al.).

Living polymerizations can also provide block copolymers with sharp transitions between the blocks. Block copolymers having A blocks and a B block can have regions near the block borders that contain a mixture of monomeric units of A and monomeric units of B. When a living polymerization technique is used, the size of such regions can be minimized, or even eliminated, leading to a sharper transition from an A block to a B block. This can be beneficial when phase separation is desired because a region of mixed monomeric units can be compatible with both blocks, thereby reducing the phase separation. On the other hand, a sharp transition with minimal regions of mixed monomeric units can promote phase separation.

Suitable commercially available (meth)acrylic-based triblock copolymers can be obtained from under the trade designation "KURARITY" from Kuraray Co., Ltd. (Tokyo, Japan). These include, for example, KURARITY LA2330, L3320, LA2250, LA2140, LA2270, KL-LK9333, LK9243, and KL-LH8156. Other suitable commercially available (meth)acrylic-based triblock copolymers can be obtained from under the trade designation "NANOSTRENGTH" from Arkema (Colombes, France). These include, for example, NANOSTRENGTH M51, M52, M53, M55, M65, and M75.

In some embodiments, the curable composition usually contains 10 to 40 weight percent (meth)acrylic-based multiblock copolymer based on a total weight of resin components in the curable composition. The amount can be at least 10, at least 12, at least 15, at least 20, at least 25, or at least 30 weight percent and up to 40, up to 35, up to 30, or up to 25 weight percent. The amount is often in a range of 10 to 40, 10 to 35, 10 to 30, 10 to 25, 15 to 40, 15 to 35, 15 to 30, 15 to 25, 20 to 40, 20 to 35, or 25 to 40 weight percent.

In some embodiments, the curable composition comprises greater than 40, 45, 50, 55 or 60 weight of the (meth)acrylic-based block copolymer based on a total weight of resin components in the curable composition. In this embodiment, the curable composition may comprise up to 10, 15, or 20 weight percent of polyol and may further comprise up to 5 or 10 weight percent of a block copolymer that is not a (meth)acrylic-based block copolymer, such as styrenic block copolymer comprising a conjugated diene block. An illustrative styrene-isoprene-styrene block copolymer is described in the examples.

In addition to the triblock copolymer, the curable composition can optionally include a (meth)acrylic-based diblock copolymer. The diblock copolymer, which can be referred to as a C-D diblock copolymer, typically includes a C block that can prepared from the same monomers that are described above as being suitable for forming the A blocks in the triblock copolymer. Further, the D block of the diblock copolymer can be prepared from the same monomers described above as being suitable for forming the B blocks in the triblock copolymer. If a diblock is used in combination with a triblock copolymer, the A and C blocks are often formed from the same monomer(s) while the B and D blocks are often formed from the same monomer(s).

The (meth)acrylic-based diblock copolymer often contains 5 to 30 weight percent C block and 70 to 95 weight percent D block. The amount of the C block and be at least 5, at least 10, at least 15, or at least 20 weight percent and up to 30, up to 25, up to 20, or up to 15 weight percent based on a total weight of the diblock copolymer. The amount of the D block can be at least 70, at least 75, at least 80, at least 85 weight percent and up to 95, up to 90, up to 85, or up to 80 weight percent. The sum of the amount of the C block and D block equals (or approaches due to a small amount of initiator residue) 100 weight percent.

The weight average molecular weight of the (meth)acrylic-based diblock is often in a range of 30 to 150 kDa. The weight average molecular weight is often at least 30, at least 40, at least 50, at least 60, at least 70, at least 80, at least 90, or at least 100 kDa and up to 150, up to 140, up to 130, up to 120, up to 110, up to 100, up to 90, or up to 80 kDa. The weight average molecular weight can be determined by gel permeation chromatography using polystyrene standards.

The curable composition typically contains 0 to 30 weight percent of the optional (meth)acrylic-based diblock copolymer based on the total weight of resin components in the curable composition. If present, the amount can be at least 5, at least 10, at least 15, or at least 20 weight percent and up to 30, up to 25, up to 20, up to 15, or up to 10 weight percent. In many embodiments, the curable composition does not contain the optional (meth)acrylic-based diblock copolymer.

Statistical (Meth)Acrylic-Based Copolymer

In some embodiments, the curable composition also includes a statistical (meth)acrylic-based copolymer. Although there are multiple methods for preparing the statistical (meth)acrylic-based copolymer, this copolymer is often formed in the presence of the (meth)acrylic-based block copolymer. That is, the (meth)acrylic-based block copolymer is dissolved in the monomer composition to form a syrup. The syrup optionally can be combined with one or more of the other components of the curable composition prior to polymerization of the monomers in the syrup.

The statistical (meth)acrylic-based copolymer is often formed from a polymerizable composition that contains one or more alkyl (meth)acrylate monomers, an optional (meth)acrylic-based macromer having a poly(alkylene oxide) group, and one or more optional polar monomers. Because the other components of the curable composition such as the epoxy resin may be present when the statistical (meth)acrylic-based copolymer is formed, the optional polar monomer is typically selected to be free of groups that can react with the epoxy resin at or near room temperature (e.g., 20 to 25 degrees Celsius).

The polymerizable composition used to form the statistical (meth)acrylic-based copolymer includes one or more alkyl (meth)acrylate monomers. Any suitable alkyl (meth)acrylate or mixture of alkyl (meth)acrylates can be included in the polymerizable composition. The choice of the alkyl (meth)acrylate can influence the glass transition temperature of the statistical (meth)acrylic-based copolymer. Typically, the monomers are selected so that the glass transition temperature of the statistical (meth)acrylic-based copolymer (an illustrative film forming polymeric material) is no greater than 20 degrees Celsius. For example, the glass transition temperature is often no greater than 15 degrees Celsius, no greater than 10 degrees Celsius, no greater than 5 degrees Celsius, or no greater than 0 degrees Celsius.

Some alkyl (meth)acrylate monomers are classified as low $T_g$ monomers based on the glass transition temperature of their corresponding homopolymers. The low $T_g$ monomers, as measured from the corresponding homopolymers, often have a $T_g$ no greater than 20 degrees Celsius, no greater than 10 degrees Celsius, no greater than 0 degrees Celsius, or no greater than −10 degrees Celsius. Other alkyl (meth)acrylates are classified as high $T_g$ monomers based on the glass transition temperature of the corresponding homopolymers. The high $T_g$ monomers, as measured from the corresponding homopolymers, often have a $T_g$ greater than 30° C., greater than 40° C., or greater than 50° C. The glass transition temperature can be measured using Dynamic Mechanical Analysis (DMA) as described in the Example section.

Suitable low $T_g$ alkyl (meth)acrylate monomers include, but are not limited to, non-tertiary alkyl acrylates but can be an alkyl (meth)acrylate having a linear alkyl group with at least 4 carbon atoms. Specific examples of alkyl (meth)acrylates include, but are not limited to, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, tetrahydrofurfuryl acrylate and combinations thereof. The alkyl (meth)acrylate monomers are typically selected to include at least one low $T_g$ monomer such as those that have a $T_g$ no greater than −10 degrees Celsius when measured as a homopolymer. Such alkyl monomers include, but are not limited to, 2-ethylhexyl acrylate, isooctyl acrylate, n-butyl acrylate, 2-methylbutyl acrylate, iso-octyl acrylate, 2-octyl acrylate, and combinations thereof.

Some suitable high $T_g$ alkyl (meth)acrylate monomers include, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl (meth)acrylate, isobornyl (meth)acrylate, stearyl (meth)acrylate, 3,3,5 trimethylcyclohexyl (meth)acrylate, and combinations thereof.

In some embodiments, the statistical (meth)acrylic-based copolymer comprises at least 10, 15, 25, or 30 weight percent of high $T_g$ alkyl (meth)acrylate monomers.

Often, the alkyl (meth)acrylate is selected to have an alkyl group with no greater than 8 carbon atoms, no greater than 7 carbon atoms, no greater than 6 carbon atoms, no greater than 5 carbon atoms, or no greater than 4 carbon atoms to enhance miscibility of the statistical (meth)acrylic-based copolymer with other components of the curable composition.

The total amount of the alkyl (meth)acrylate can be any amount up to 30 to 100 weight percent weight percent based on the total weight of monomers within the (meth)acrylic polymerizable composition used to form the statistical (meth)acrylic-based copolymer. The amount of the alkyl (meth)acrylate can be, for example, at least 30, at least 35, at least 40, at least 45, or at least 50 weight percent and up to 100, up to 99, up to 98, up to 97, up to 95, up to 92, up to 90, up to 85, or up to 80 weight percent.

In some embodiments, the statistical (meth)acrylic-based copolymer is usually prepared from a polymerizable composition that further includes a (meth)acrylic-based monomer (i.e., macromer) having a poly(alkylene oxide) group. This monomer, which can be referred to as the "(meth) acrylate macromer", usually has a number average molecular weight of at least 300 Daltons (Da). The poly(alkylene oxide) group is typically poly(ethylene oxide), poly(propylene oxide), poly(tetramethylene oxide), or a copolymer thereof. The terms "poly(tetramethylene oxide)" and "poly(tetrahydrofuran)" can be used interchangeably.

The (meth)acylate macromer is usually of Formula (I).

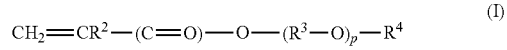

In Formula (I), the group $R^2$ is hydrogen or methyl. Each $R^3$ is independently an alkylene having 2 to 4 carbon atoms and $R^4$ is an alkyl having 1 to 4 carbon atoms. The variable p being in a range of 5 to 150. For example, the variable n is at least 5, at least 10, at least 20, at least 30, at least 40, or at last 50 and up to 150, up to 125, up to 100, up to 90, up to 80, up to 70, up to 60, up to 50, up to 40, or up to 30. The group $—(R^3—O)_p—R^4$ is usually a poly(tetramethylene oxide), poly(propylene oxide), poly(propylene oxide)-co-poly(ethylene oxide), or poly(ethylene oxide) group.

The number average molecular weight of the (meth) acrylate macromer with the pendant poly(alkylene oxide) group is often at least 300 or 400 Daltons (Da). While the number average molecular weight can be up to 10,000 Da, it is usually up to 5000 or 4000 Da. The number average molecular weight can be at least 300, at least 400, at least 500, at least 600, at least 800, at least 1000, at least 1200, or at least 1500 Da and up to 10,000, up to 5000, up to 4500, up to 4000, up to 3500, up to 3000, up to 2500, up to 2000, up to 1500, or up to 1000 Da. If the number average molecular weight is greater than 5000 Da, the (meth)acrylate macromer may crystallize depending on its composition. If the weight is less than 300 Da, the cured product may have inferior impact resistance.

The (meth)acrylate macromer is typically selected so that it is not waxy at room temperature. That is, the (meth) acrylate macromer is selected to be non-crystalline and a liquid at room temperature. The (meth)acrylate macromer often has a glass transition temperature (as measured using a homopolymer of the macromer) that is no greater than −20° C. For example, the glass transition temperature can be no greater than −30° C., no greater than −40° C., no greater than −50° C., or no greater than −60° C. Such a low macromer glass transition temperature imparts compliance and flexibility to the statistical (meth)acrylic-based copolymer and to the adhesive composition containing the statistical (meth)acrylic-based copolymer.

Examples of such commercially available (meth)acrylate macromers can be obtained from Millipore Sigma (Burlington, Massachusetts, USA) include poly(ethylene glycol) phenyl ether acrylate having a number average molecular weight of 324 Da, methoxy polyethylene glycol 550 acrylate (MPEG550A) having a number average molecular weight of 550 Da, poly(ethylene glycol) methyl ether acrylate having a number average molecular weight of 480 Da, poly(ethylene glycol) methyl ether acrylate having a number average molecular weight of 2,000 Da, poly(ethylene glycol) methyl ether acrylate having a number average molecular weight of 5,000 Da, and poly(propylene glycol) acrylate having a number average molecular weight of 475 Da.

Other suitable (meth)acrylate macromers are available under the tradename BISOMER from Geo Specialty Chemicals, Ambler, PA, such as BISOMER PPA6 (poly(propylene glycol) acrylate reported to have a number average molecular weight of 420 Daltons), BISOMER PEM63P HD (a mixture of poly(ethylene glycol) methacrylate and poly(propylene glycol) reported to have a number average molecular weight of 524 Daltons), BISOMER PPM5 LI (poly(propylene glycol) methacrylate reported to have a number average molecular weight of 376 Daltons), BISOMER PEM6 LD (poly(ethylene glycol) methacrylate reported to have a number average molecular weight of 350 Daltons), BISOMER MPEG350MA (methoxy poly(ethylene glycol) methacrylate) reported to have a number average molecular weight of 430 Daltons), and BISOMER MPEG550MA (methoxy poly(ethylene glycol) methacrylate reported to have a number average molecular weight of 628 Daltons). Other suitable (meth)acrylate macromers are available under the tradename MIRAMER from Miwon Specialty Chemical Company, Gyeonggi-do, Korea, such as MIRAMER M193 MPEG600MA (methoxy poly(ethylene glycol) methacrylate reported to have a number average molecular weight of 668 Daltons, MIRAMER M164 (nonyl phenol poly(ethylene glycol) acrylate reported to have a number average molecular weight of 450 Daltons), MIRAMER M1602 (nonyl phenol poly(ethylene glycol) acrylate reported to have a number average molecular weight of 390 Daltons), and MIRAMER M166 (nonyl phenol poly(ethylene glycol) acrylate reported to have a number average molecular weight of 626 Daltons. Still other suitable (meth)acrylate macromers are available from Sans Esters Corporation, New York, NY such as MPEG-A400 (methoxy poly(ethylene glycol) acrylate reported to have a number average molecular weight of 400 Daltons), and MPEG-A550 (methoxy poly(ethylene glycol) acrylate reported to have a number average molecular weight of 550 Daltons. Various combinations of such macromers may be used if desired.

In many embodiments, the polymerizable composition used to form the statistical (meth)acrylic-based copolymer contains 0 to 40 weight percent (meth)acrylate macromer. The macromer tends to increase the open time of the curable composition when exposed to radiation suitable for curing. Long open times provide more time to position the curable composition adjacent to the desired substrate before a significant amount of curing has occurred. If present, the amount is often at least 1, at least 2, at least 3, at least 4, at least 5, at least 10, at least 15, or at least 20 weight percent and up to 40, up to 35, up to 30, up to 25, up to 20, up to 15, or up to 10 weight percent based on the total weight of the polymerizable composition used to form the statistical (meth)acrylic-based copolymer. The amount can range, for example, from 4 to 40, 5 to 40, 5 to 35, 5 to 30, 5 to 25, 5 to 20, or 5 to 15 weight percent (meth)acylate macromer.

In addition to the alkyl (meth)acrylate and optional (meth)acrylate macromer, the polymerizable composition used to form the statistical (meth)acrylic-based copolymer optionally contains a polar monomer. The polar monomer contains an ethylenically unsaturated group plus a polar group. The ethylenically unsaturated group is either a vinyl or (meth)acryloyl group. Suitable polar groups can be a hydroxyl group, an ether (or polyether) group, or an epoxy group. The polar monomer is typically not an acidic monomer because these monomers tend to be reactive with the epoxy resin in the curable composition. Further, the polar monomer is typically not a nitrogen-containing monomer because of the reactivity of these groups with epoxy resins. That is, the polymerizable composition used to form the statistical (meth)acrylic-based copolymer is free of acidic polar monomers or contains less than 0.5, less than 0.2, less than 0.1, less than 0.05, less than 0.02, or less than 0.01 weight percent acidic polar monomers based on the total weight of the polymerizable composition. Further, the polymerizable composition used to form the statistical (meth)acrylic-based copolymer is free of nitrogen-containing polar monomers or contains less than 0.5, less than 0.2, less than 0.1, less than 0.05, less than 0.02, or less than 0.01 weight percent nitrogen-containing polar monomers based on the total weight of the polymerizable composition.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), ethoxylated hydroxyethyl (meth)acrylate, and aryloxy substituted hydroxyalkyl (meth)acrylates (e.g., 2-hydroxy-2-phenoxypropyl (meth)acrylate).

Exemplary ether-containing polar monomers include those selected from 2-ethoxyethoxyethyl (meth)acrylate, 2-methoxyethoxyethyl (meth)acrylate, di(ethylene glycol)-2-ethylhexyl-ether acrylate, ethylene glycol-methyl ether acrylate, and combinations thereof. Suitable ether-containing (meth)acrylate monomers usually have a number average molecular weight less than 300 Daltons, less than 275 Daltons, or less than 250 Daltons.

The amount of any non-acidic and non-nitrogen-containing polar monomers in the polymerizable compositions used to form the statistical (meth)acrylic-based copolymer can be in a range of 0 to 30 weight percent based on the total weight of monomers in the polymerizable composition. The amount can be 0, at least 0.5, at least 1, at least 2, at least 3, at least 5, at least 10, or at least 15 weight percent and up to 30, up to 25, up to 20, up to 15, up to 10, or up to 5 weight percent based on the total weight of monomers in the polymerizable composition.

A crosslinking monomer can be optionally (but is usually) included in the polymerizable composition. The crosslinking monomer typically contains a plurality of polymerizable (meth)acryloyl groups (e.g., 2, 3, or 4 (meth)acryloyl groups). That is, the crosslinking monomer is typically a multifunctional (meth)acrylate monomer. Crosslinking the statistical (meth)acrylic-based copolymer can contribute to the dimensional stability of the curable composition.

Examples of crosslinking monomers with two (meth)acryloyl groups include, but are not limited to, glycerol di(meth)acrylate, hexanediol di(meth)acrylate, triethylene glycol di(meth)acrylate, 1,3-propanediol di(meth)acrylate, 1,6-hexanediol di(meth)acrylate, 1,4-cyclohexanediol di(meth)acrylate, urethane di(meth)acrylate, and polyethylene glycol di(meth)acrylates. Examples of crosslinking monomers with three (meth)acryloyl groups include, but are not limited to, glycerol tri(meth)acrylate, trimethylolpropane tri(meth)acrylate, 1,2,4-butanetriol tri(meth)acrylate, and pentaerythritol tri(meth)acrylate. Examples of crosslinking monomers with four or more (meth)acryloyl groups include, but are not limited to, pentaerythritol tetra(meth)acrylate, sorbitol hexa(meth)acrylate.

The polymerizable composition can contain 0 to 5 weight percent of the crosslinking monomer. If present, the amount can be at least 0.01, at least 0.05, at least 0.1, at least 0.2, at least 0.3, at least 0.5, or at least 1 weight percent and up to 5, up to 4, up to 3, up to 2, or up to 1 weight percent based on the total weight of polymerizable components in the polymerizable composition.

The polymerizable composition used to form the statistical (meth)acrylic-based copolymer often contains 0 to 40 weight percent (meth)acrylate macromer, 30 to 100 weight percent alkyl (meth)acrylate, and 0 to 30 weight percent non-acidic and non-nitrogen containing polar monomers (e.g., the polar monomer is often a hydroxy-containing monomer) based on the total weight of monomers in the polymerizable composition. In some examples, the polymerizable composition used to form the statistical (meth)acrylic-based copolymer contains 3 to 40 weight percent (meth)acrylate macromer, 30 to 97 weight percent alkyl (meth)acrylate, and 0 to 30 weight percent non-acidic and non-nitrogen containing polar monomers (e.g., the polar monomer is often a hydroxy-containing monomer) based on the total weight of monomers in the polymerizable composition. In other examples, the polymerizable composition contains 5 to 30 weight percent (meth)acrylate macromer, 50 to 95 weight percent alkyl (meth)acrylate, and 0 to 20 weight percent non-acidic and non-nitrogen containing polar monomers. In other examples, the polymerizable composition contains 5 to 25 weight percent (meth)acrylate macromer, 60 to 90 weight percent alkyl (meth)acrylate, 0 to 20 weight percent non-acidic and non-nitrogen containing polar monomers. Any of these polymerizable compositions can further include 0 to 5 weight percent crosslinking monomer.

In addition to the monomers (e.g., alkyl (meth)acylate and optional monomers), the polymerizable composition typically includes a free-radical initiator. In many embodiments, the free-radical initiator can be a thermal initiator or a photoinitiator.

Suitable thermal initiators include various azo compound such as those commercially available under the trade designation VAZO from Chemours Co. (Wilmington, DE, USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpenta-nenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used to form the statistical (meth)acrylic-based copolymer. While any photoinitiator can be used if the polymerization reaction to form the statistical (meth)acrylic-based copolymer if the epoxy resin is not present during the polymerization reaction, it is often selected to be activated by a wavelength greater than 380 nanometers or at least 400 nanometers if an epoxy resin is present.

Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA)).

Other free radical photoinitiators are acyl phosphine oxides such as those described, for example, in U.S. Pat. No. 4,737,593 (Ellrich et al.). The acyl phosphine oxides are often of Formula (III) or (IV).

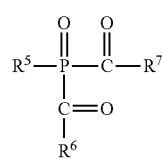

(III)

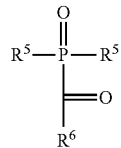

(IV)

In Formulas (III) and (IV), each $R^5$ is independently a linear or branched alkyl having 1 to 18 carbon atoms, a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring with 5 or 6 ring members and having one or more sulfur, nitrogen, or oxygen heteroatoms. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms).

Each $R^6$ in Formulas (III) and (IV) is independently a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring having one or more sulfur, nitrogen, or oxygen heteroatoms and having 5 or 6 ring members. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms). Groups $R^6$ and $R^7$ in Formula (III) can combine to form a ring that contains 4 to 10 carbon atoms that can optionally be substituted with one or more alkyl groups (e.g., 1 to 6 alkyl groups).

In some embodiments, the acyl phosphine is of Formula (III) where $R^5$ is aryl, $R^6$ is an aryl substituted with an alkyl or alkoxy, and $R^7$ is an aryl substituted with an alky or alkoxy. In some particular embodiments, the acyl phosphine is bis(2,4,6-trimethylbenzoyl)phenyl phosphine oxide, which is commercially available under the trade designation IRGACURE 819 from Ciba Specialty Chemicals.

In other embodiments, the acyl phosphine is of Formula (IV) where each $R^5$ is any aryl and $R^6$ is an aryl substituted with an alkyl or alkoxy. For example, the acyl phosphine can be diphenyl(2,4,6-trimethylbenzoyl) phosphine oxide, which is commercially available under the trade designation TPO from Millipore Sigma (formerly Sigma Aldrich), St. Louis, MO, USA.

In still other embodiments, the acyl phosphine is of Formula (IV) where a first $R^5$ is an aryl, a second $R^5$ is an alkyl, and $R^6$ is an aryl substituted with an alkyl. For example, the acyl phosphine can be ethyl(2,4,6-trimethylbenzoyl)phenyl phosphinate, which is commercially available under the trade designation TPO-L from Lambson, Wetherby, West Yorkshire, England.

The amount of the free radical initiator can influence the molecular weight of the statistical (meth)acrylic-based copolymer, with larger amounts of the free radical initiator typically producing lower molecular weight polymers. The amount of the initiator is often in a range of 0.01 to 5 weight percent based on the total weight of polymerizable components in polymerizable composition. The amount can be at least 0.01, at least 0.05, at least 0.1, at least 0.2, at least 0.5, or at least 1 weight percent and up to 5, up to 4, up to 3, up to 2, up to 1, or up to 0.5 weight percent.

Chain-transfer agents optionally can be included in the polymerizable composition to control the molecular weight of the statistical (meth)acrylic-based copolymer. Suitable chain-transfer agents include, but are not limited to, those selected from the group of carbon tetrabromide, hexabromoethane, bromotrichloromethane, 2-mercaptoethanol, tert-dodecylmercaptan, isooctylthioglycoate, 3-mercapto-1,2-propanediol, cumene, pentaerythritol tetrakis(3-mercapto butyrate) (available under the trade name KARENZ MT PE1 from Showa Denko), ethylene glycol bisthioglycolate, and mixtures thereof. Depending on the reactivity of the chain-transfer agent selected, the amount of chain transfer agent is often in a range of 0 to 5 weight percent based on the total weight of monomers in the polymerizable composition. In some embodiments, the amount of the chain transfer agent is at least 0.05 weight percent, at least 0.1 weight percent, at least 0.2 weight percent, at least 0.3 weight percent, or at least 0.5 weight percent and can be up to 5 weight percent, up to 4.5 weight percent, up to 4 weight percent, up to 3.5 weight percent, up to 3 weight percent, up to 2.5 weight percent, up to 2 weight percent, up to 1.5 weight percent, or up to 1 weight percent. The weight percent values are based on the total weight of the polymerizable components in the polymerizable composition to form the statistical (meth)acrylic-based copolymer.

The statistical (meth)acrylic polymer typically has a weight average molecular weight of at least 100,000 Daltons. For example, the weight average molecular weight can be at least 200,000 Daltons, at least 300,00 Daltons, at least 400,000 Daltons, at least 500,000 Daltons, or at least 600,000 Daltons and up to 1,000,000 Daltons, up to 2,000,000 Daltons, or up to 3,000,000 Daltons or even higher. The weight average molecular weight can be determined using size exclusion chromatography (SEC) with polystyrene standards.

In some embodiments, the curable composition often contains 20 to 60 weight percent statistical (meth)acrylic-based copolymer based on a total weight of resin components in the curable composition. The amount can be at least 20, at least 25, at least 30, at least 35, at least 40, or at least 45 weight percent and up to 75, up to 70, up to 65, up to 60, up to 55, up to 50, up to 45, or up to 40 weight percent. For example, the amount can range from 20 to 50, 25 to 60, 25 to 50, 30 to 60, 30 to 50, or 40 to 60 weight percent.

In some embodiments, the curable composition comprises greater than 60, 65, 70, 75, 80, 85, 90 weight percent statistical (meth)acrylic-based copolymer based on a total weight of resin components in the curable composition. In this embodiment, the curable composition may lack a a (meth)acrylic-based block copolymer.

Other Film Forming Polymeric Materials

When the curable composition is provided as an adhesive layer disposed on a substrate, such as a tape, the film forming polymeric material typically provides a dimensionally stable layer of curable composition that can be wound into a roll or die cut. Although in some embodiments, the previously described (meth)acrylic polymer(s) are preferred film forming polymeric materials, various other elastomers and thermoplastic polymers can be utilized.

The film forming polymeric material is typically an elastomeric polymer, a thermoplastic polymer, or a combination thereof. Common polymers include polyurethanes, rubber (e.g. natural rubber, synthetic rubber such as butyl rubber, isobutyl, nitrile or butadiene rubbers), polyolefins, fluoropolymers, silicones, and styrenic block copolymers. Styrenic block copolymers comprise one or more styrenic end blocks and an unsaturated, partly hydrogenated or fully hydrogenated polydiene block, most commonly polybutadiene, polyisoprene, or poly(iso)butylene. Other common organic polymers include polyolefins (e.g. poly(ethylene), poly(propylene) and copolymer including alpha olefins; vinyl polymers including ethylene vinyl acetate; poly(vinyl alcohol, poly(vinyl)acetate, poly(vinyl chloride), polyvinyl acetal such as polyvinyl butyral; phenoxy resins, poly(styrene), poly(oxymethylene), poly(alkylene oxide), poly(carbonate), poly (phenylene oxides), poly(urethanes), poly (ureas), acrylonitrile-butadiene-styrene (ABS), poly (amides), poly(lactate) (PLA), poly(etheretherketone) (PEEK), poly(sulfone) (PSU), and poly(ethersulfone)(PES).

In some embodiments, the film forming polymeric material comprises two or more different film forming polymeric materials.

In some embodiments, the film forming polymer material has a Tg less than 20° C., as previously described. In other embodiments, the film forming polymer material has a Tg greater than 20, 25, 30, 40, 50, or 60° C.; yet the uncured epoxy resin and/or optional polyol functions as a plasticizer such that the film forming polymeric material together with the uncured epoxy resin has a Tg less than 20° C., as previously described.

In some embodiments, the film forming polymer material comprises polyurethane. Polyurethanes are prepared from at least one isocyanate including a diisocyanate and at least one polyol including a diol; as well as other components such as diol chain extenders. Various polyols including polyester and polyether polyols are subsequently described.

The diisocyanate can be monomeric, oligomeric or polymeric. An example of a suitable diisocyanate includes a diisocyanate having the structure:

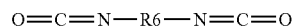

R6 is substituted or unsubstituted $C_1$-$C_{40}$ alkylene, $C_2$-$C_{40}$ alkenylene, $C_4$-$C_{20}$ arylene, $C_4$-$C_{20}$ arylene-$C_1$-$C_{40}$ alkylene-$C_4$-$C_{20}$ arylene, $C_4$-$C_{20}$ cycloalkylene, and $C_4$-$C_{20}$ aralkylene. In some embodiments, the diisocyanate is chosen from dicyclohexylmethane-4,4'-diisocyanate, isophorone diisocyanate, hexamethylene diisocyanate, 1,4-phenylene diisocyanate, 1,3-phenylene diisocyanate, m-xylylene diisocyanate, tolylene-2,4-diisocyanate, tolylene-2,6-diisocyanate, poly(hexamethylene diisocyanate), 1,4-cyclohexylene diisocyanate, 4-chloro-6-methyl-1,3-phenylene diisocyanate, 4,4'-diphenylmethane diisocyanate, 2,4'-diphenylmethane diisocyanate, 1,4-diisocyanatobutane, 1,8-diisocyanatooctane, 2,5-toluene diisocyanate, methylene bis(o-chlorophenyl diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, tetramethyl-m-xylylene diisocyanate, 1,12-diisocyanatododecane, 2-methyl-1,5-diisocyanatopentane, 2,2,4-trimethylhexyl diisocyanate, or a mixture thereof. In some embodiments, the diisocyanate may be a chain extended diisocyanate, i.e. the reaction product of a diisocyanate and a dihydroxyl terminated oligomer or polymer, e.g. a dihydroxyl terminated, linear oligomer or polymer.

In some embodiments, the polyurethane is thermoplastic. Various thermoplastic polyurethanes are commercially available, such as the exemplified thermoplastic polyurethane.

In some embodiments, the film forming polymer material comprises polyester.

Polyesters are prepared by reacting dicarboxylic acids (or their diester equivalent) and polyols (e.g. diols). Various polyols including polyester and polyether polyols are subsequently described.

Examples of aliphatic dicarboxylic acids are saturated aliphatic dicarboxylic acids, such as oxalic acid, malonic acid, succinic acid, a-methylsuccinic acid, glutaric acid, adipic acid, pimelic acid, azelaic acid, sebacic acid or dimerized linoleic acid; or unsaturated aliphatic polycarboxylic acids, such as maleic acid, fumaric acid, mesaconic acid, citraconic acid, glutaconic acid or itaconic acid, and also possible anhydrides of these acids. Aromatic dicarboxylic acids may also be utilized as well as blends of dicarboxylic acids. Illustrative tape composition comprises polyester and epoxy resin are described in U.S. Pat. No. 6,254,954; incorporated herein by reference.

In some embodiments, the film forming polymeric material comprise polyvinyl acetal.

The polyvinyl acetal resin generally has repeating units represented by

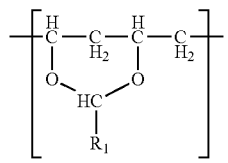

wherein $R_1$ is hydrogen or a C1-C7 alkyl group.

Polyvinyl acetal resin is obtained, for example, by reacting polyvinyl alcohol with aldehyde, as known in the art. (See for examples WO2016/094277)

The content of polyvinyl acetal (e.g. butyral) typically ranges from 65 wt-% up to 90 wt-% of the polyvinyl acetal (e.g. butyral) resin. In some embodiments, the content of polyvinyl acetal (e.g. butyral) ranges from about 70 or 75 up to 80 or 85 wt.-%.

The content of polyvinyl alcohol typically ranges from about 10 to 30 wt-% of the polyvinyl acetal (e.g. butyral) resin. In some embodiments, the content of polyvinyl alcohol ranges from about 15 to 25 wt-%.

The content of polyvinyl acetate of the polyvinyl acetal resin can be zero or range from 1 to 8 wt-% of the polyvinyl acetal (e.g. butyral) resin. In some embodiments, the content of polyvinyl acetate ranges from about 1 to 5 wt-%.

In some embodiments, the alkyl residue of aldehyde comprises 1 to 7 carbon atoms. In other embodiments, the alkyl reside of the aldehyde comprises 3 to 7 carbon atoms such as in the case of butylaldehyde ($R_1$=3), hexylaldehyde ($R_1$=5), n-octylaldehyde ($R_1$=7). Of these butylaldehyde, also known as butanal is most commonly utilized. Polyvinyl butyral ("PVB") resin is commercially available from Kuraray under the trade designation "Mowital™" and Solutia under the trade designation "Butvar™".

The weight average molecular weight ($M_w$) of such other film forming polymers is typically with the same range as previously described for the (meth)acrylic-based triblock copolymer A-B-A. In some embodiments, the weight average molecular weight ($M_w$) of such other film forming polymers is greater than 50,000; 55,000, or 60,000 Daltons.

In some embodiments, the curable composition (e.g. of the first article) comprises greater than 30, 45, 40, 45, 50, 55, 60, 65, 70, 75, 80, 85, or 90 weight percent of other film forming polymeric materials based on a total weight of resin components in the curable composition. In some embodiments, the curable composition comprises no greater than 90, 85, 80, 75, 70, 65, 60, 55, 50, 45, or 40 weight percent of other film forming polymeric materials. In this embodiment, the curable composition may lack (meth)acrylic-based polymer(s).

In other embodiments, the curable liquid epoxy resin composition may lack a film forming polymeric material or may comprise such material in an insufficient concentration to form a film.

Epoxy Resin

The curable composition includes an epoxy resin that has at least one epoxy functional group (i.e., oxirane group) per molecule. As used herein, the term oxirane group refers to the following divalent group.

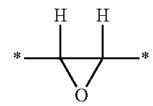 [SMILES: *C1OC1*]

The asterisks denote a site of attachment of the oxirane group to another group. If the oxirane group is at the terminal position of the epoxy resin, the oxirane group is typically bonded to a hydrogen atom.

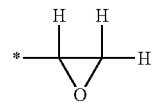 [SMILES: *C1CO1]

This terminal oxirane group is often (and preferably) part of a glycidyl group.

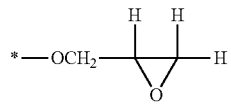

While the epoxy resin can have a single oxirane group per molecule, it often has at least two oxirane groups per molecule. For example, the epoxy resin can have 1 to 10, 2 to 10, 2 to 6, 2 to 4, or 2 oxirane groups per molecule. The oxirane groups are usually part of a glycidyl group.

Epoxy resins can be either a single material or a mixture of different materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups. In another example, a first epoxy resin in the mixture is a liquid while a second epoxy resin is a solid such as a glassy or brittle solid that is miscible with the first epoxy resin.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, carbonyl groups, carbonyloxy groups, and the like. The epoxy resin can also be a silicone-based material such as a polydiorganosiloxane-based material.

In most embodiments, the epoxy resin includes a glycidyl ether. Exemplary glycidyl ethers can be of Formula (V).

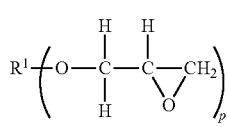
(V)

In Formula (V), group $R^1$ is a p-valent group that is aromatic, aliphatic, or a combination thereof. Group $R^1$ can be linear, branched, cyclic, or a combination thereof. Group $R^1$ can optionally include halo groups, oxy groups, carbonyl groups, carbonyloxy groups, and the like. Although the variable p can be any suitable integer greater than or equal to 1, p is often an integer in the range of 2 to 6 or 2 to 4. In many embodiments, p is equal to 2.

In some exemplary epoxy resins of Formula (V), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or mixture thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms. The heteroatoms in the heteroalkylene are often oxy groups. Suitable arylene groups often have 6 to 18 carbon atoms, 6 to 12 carbon atoms, or 6 to 10 carbon atoms. For example, the arylene can be phenylene. Group $R^1$ can further optionally include halo groups, oxy groups, carbonyl groups, carbonyloxy groups, and the like.

Some epoxy resins of Formula (V) are diglycidyl ethers where $R^1$ includes (a) an arylene group or (b) an arylene group in combination with an alkylene, heteroalkylene, or both. Group $R^1$ can further include optional groups such as halo groups, oxy groups, carbonyl groups, carbonyloxy groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (V) are derived from bisphenol A (i.e., bisphenol A is 4,4'-dihydroxydiphenylmethane). Examples include, but are not limited to, those available under the trade designation EPON (e.g., EPON 828, EPON 872, EPON 1001F, EPON 1004, and EPON 2004) from Hexion Specialty Chemicals, Inc. in Houston, TX, those available under the trade designation DER (e.g., DER 331, DER 332, and DER 336) from Olin Epoxy (Clayton, MO, USA), and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane).

Other epoxy resins of Formula (V) are diglycidyl ethers of a poly(alkylene oxide) diol. These epoxy resins can be referred to as diglycidyl ethers of a poly(alkylene glycol) diol. The variable p is equal to 2 and $R^4$ is a heteroalkylene having oxygen heteroatoms. The poly(alkylene glycol) can be a copolymer or homopolymer. Examples include, but are not limited to, diglycidyl esters of poly(ethylene oxide) diol, diglycidyl esters of poly(propylene oxide) diol, and diglycidyl esters of poly(tetramethylene oxide) diol. Epoxy resins of this type are commercially available from Polysciences, Inc. (Warrington, PA, USA) such as those derived from a poly(ethylene oxide) diol or from a poly(propylene oxide) diol having a weight average molecular weight of about 400 Daltons, about 600 Daltons, or about 1000 Daltons. Other aliphatic epoxy resins of this type are commercially available from Nagase & Co., LTD (Osaka, Japan) under the trade designation DENACOL (e.g., DENACOL Ex-830).

Still other epoxy resins of Formula (V) are diglycidyl ethers of an alkane diol ($R^1$ is an alkylene and the variable p is equal to 2). Examples include a diglycidyl ether of 1,4-dimethanol cylcohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. (Houston, TX, USA).

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Company (Midland, MI, USA) under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent (i.e. a liquid at 25° C.) that has a lower viscosity and at least one second epoxy resin that has a higher viscosity. In some embodiments, the higher viscosity epoxy resin is a solid at 25° C. The reactive diluent tends to lower the viscosity of the epoxy resin mixture and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals (Columbus, OH, USA) and under the trade designation EPODIL 757 from Evonik Corporation (Essen, North Rhine-Westphalia, Germany). Other reactive diluents have only one functional group (i.e., one oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Evonik Corporation such as EPODIL 746 (2-ethylhexyl glycidyl ether) and EPODIL 748 (aliphatic glycidyl ether).

The epoxy resins often have an equivalent weight in a range of 50 to 750, 800, 850, or 900 grams/equivalent. The equivalent weight of the epoxy resin refers to the weight of resin in grams that contains one equivalent of epoxy. The equivalent weight is often no greater than 750 grams/equivalent, no greater than 700 grams/equivalent, no greater than 650 grams/equivalent, no greater than 600 grams/equivalent, no greater than 550 grams/equivalent, no greater than 500 grams/equivalent, no greater than 450 grams/equivalent, no greater than 400 grams/equivalent, no greater than 350 grams/equivalent, no greater than 300 grams/equivalent, or no great than 250 grams/equivalent and is often at least 50 grams/equivalent, at least 75 grams/equivalent, at least 100 grams/equivalent, at least 125 grams/equivalent, or at least 150 grams/equivalent. In some embodiments, the equivalent weight is often in a range of 50 to 750 grams/equivalent, 50 to 500 grams/equivalent, 100 to 500 grams/equivalent, 100 to 300 grams/equivalent, or 150 to 250 grams/equivalent.

In many embodiments, 100 weight percent of the epoxy resin is of Formula (I). In other embodiments, at least 95 weight percent, at least 90 weight percent, at least 85 weight percent, at least 80 weight percent, at least 75 weight percent, or at least 70 weight percent of the epoxy resin is of Formula (I).

In many embodiments, 100 weight percent of the epoxy resin is a diglycidyl ether (i.e., a compound of Formula (I) with p equal to 2). In other embodiments, the epoxy resin is a mixture of compounds of Formula (I) with p equal to 2 and compounds of Formula (I) with p not equal to 2. In such mixtures, the amount of the diglycidyl ether is often at least 50 weight percent, at least 60 weight percent, at least 70 weight percent, at least 75 weight percent, at least 80 weight percent, at least 85 weight percent, at least 90 weight percent, or at least 95 weight percent based on the total weight of the epoxy resin.

In most embodiments, the epoxy resin is free of compounds that have an oxirane group that is not a glycidyl group. If such compounds are included, however, they typically make up less than 30 weight percent, less than 20 weight percent, less than 10 weight percent, less than 5 weight percent, less than 2 weight percent, less than 1 weight percent, or less than 0.5 weight percent based on the total weight of the epoxy resin.

The curable composition (e.g. of the first article) usually contains 10 to 50 weight percent epoxy resin based on a total weight of resin components within the curable composition. The amount can be at least 10, at least 15, at least 20, at least 25, or at least 30 weight percent and up to 50, up to 45, up to 40, up to 35, or up to 30 weight percent. For example, the amount can be in a range of 10 to 45, 10 to 40, 15 to 50, 15 to 45, 15 to 40, 20 to 50, 20 to 45, or 20 to 40 weight percent based on the total weight of resin components within the curable composition.

In other embodiments, the curable composition comprises at least 60, 70, 80, 90 wt. % or greater of epoxy resin. In this embodiment, the curable composition may be a liquid epoxy resin lacking a film forming polymer.

Photoacid Generator

A photoacid generator, which can also be referred to as a cationic photoinitiator, is activated to initiate polymerization of the epoxy resin within the curable composition. It is typically selected to be sensitive to (activated by) radiation in the ultraviolet region of the electromagnetic spectrum. For example, the photoacid generator is often selected to be activated at wavelengths less than or equal to 380 nanometers in the ultraviolet region of the electromagnetic spectrum.

Some suitable photoacid generators are aryl-containing (e.g., bis(aryl-containing)) iodonium salts. Example aryl-containing iodonium salts such as those with two aryl groups such as bis(4-tert-butylphenyl) iodonium hexafluoroantimonate (available under the trade designation FP5034 from Hampford Research Inc. (Stratford, CT, USA)), bis(4-tert-butylphenyl) iodonium camphorsulfonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, (4-methoxyphenyl)phenyl iodonium triflate, bis(4-methylphenyl) iodonium hexafluorophosphate (available under the trade designation OMNICAT 440 from IGM Resins (Bartlett, IL, USA)), ([4-(octyloxy)phenyl]phenyl iodonium hexafluorophosphate), ([4-(octyloxy)phenyl]phenyl iodonium hexafluoroantimonate), (4-isopropylphenyl)(4-methylphenyl) iodonium tetrakis(pentafluorophenyl) borate (available under the trade designation RHODORSIL 2074 from Bluestar Silicones (East Brunswick, NJ, USA)), and 4-(2-hydroxy-1-tetradecyloxy)phenyl]phenyl iodonium hexafluoroantimonate.

Other suitable photoacid generators are triaryl sulfonium salts. Example triaryl sulfonium salts include, but are not limited to, triphenyl sulfonium hexafluoroantimonate (available under the trade designation CT-548 from Chitec Technology Corp. (Taipei, Taiwan)), diphenyl(4-phenylthio)phenyl sulfonium hexafluorophosphate, diphenyl(4-phenylthio)phenyl sufonium hexafluoroantimonate, bis(4-(diphenylsulfonio)phenyl)sulfide bis(hexafluorophosphate), and bis(4-(diphenylsulfonio)phenyl)sulfide hexafluoroantimonate. Blends of triaryl sulfonium salts are available from Synasia (Metuchen, NJ, USA) under the trade designation SYNA PI-6992 for hexafluorophosphate salts and under the trade designation SYNA PI-6976 for hexafluoroantimonate salts. Mixtures of triaryl sulfonium salts are commercially available from Aceto Pharma Corporation (Port Washington, NY, USA) under the trade designations UVI-6992 and UVI-6976.

In some embodiments, the anion of the photoacid generator is selected to be the same as the anion of the ionic liquid included in the curable composition. That is, the anion is selected to be $SbF_6^-$, $PF_6^-$, or a mixture thereof.

The photoacid generator is typically used in an amount equal to at least 0.5 weight percent and up to 5 weight percent based on the total weight of the resin components in the curable composition. In some embodiments, the amount is at least 0.5, at least 0.6, at least 0.7, at least 0.8, at least 1, or at least 2 weight percent and up to up to 5 weight percent, up to 3.5 weight percent, up to 3 weight percent, up to 2.5 weight percent, up to 2 weight percent, or up to 1.5 weight percent based on the total weight of resin components in the curable composition.

The curable composition is typically free of both heat-activated curatives and thermal acid generators for epoxy resins. Examples of such heat activated curatives include, but are not limited to, dicyandiamide (DICY). Examples of thermal acid generators include, but are not limited to, products available under the trade designations NACURE, TAG, and K-PURE from King Industries (Norwalk, CT, USA).

Ionic Liquids

The curable composition further includes an ionic liquid. The ionic liquid has a cation that includes either nitrogen or sulfur and an anion that is $SbF_6^-$, $PF_6^-$, or a mixture thereof. The ionic liquid includes at most one aromatic ring. The ionic liquid has a melting point that is less than 100 degrees Celsius. In most embodiments, the melting point is in a range of −45 to 100 degrees Celsius. The melting point can be determined according to ASTM method E794-06 (reapproved 2018).

The ionic liquid is an ammonium salt of Formula (VI), a sulfonium salt of Formula (VII), an imidazolium salt of Formula (VIII), pyridinium salt of Formula (IX), pyrrolidinium salt of Formula (X).

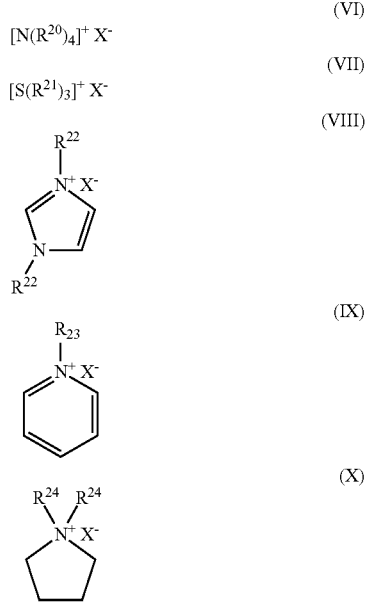

In these formulas, each $R^{20}$, $R^{21}$, $R^{22}$, $R^{23}$, and $R^{24}$ is independently an alkyl, a hydroxy substituted alkyl, or an ether-containing group of formula —$(R^{30}$—O$)_y$—$R^{31}$ where $R^{30}$ is an alkylene, $R^{31}$ is an alkyl, and y is an integer in a range of 1 to 10. Any of the alkyl and/or alkylene groups can have 1 to 20 carbon atoms such as at least 1, at least 2, at least 3, or at least 5 and up to 20, up to 18, up to 16, up to 12, up to 10, up to 8, up to 6, up to 4, or up to 3 carbon atoms. The alkylene often has 1 to 3 carbon atoms. In many embodiments, each $R^{20}$, $R^{21}$, $R^{22}$, $R^{23}$, and $R^{24}$ is an alkyl such as methyl or ethyl. Each $X^-$ is either $SbF_6^-$ or $PF_6^-$.

In some embodiments, the anion ($X^-$) of the ionic liquid is selected to be identical to the anion used in the photoacid generator included in the curable composition.

The amount of the ionic liquid in the curable composition is typically in a range of 0.5 to 20 weight percent based on a total weight of the curable composition. The amount can be at least 0.5, at least 1, at least 2, at least 3, at least 4, or at least 5 weight percent and up to 20, up to 18, up to 15, up to 12, up to 10, up to 8, up to 6, or up to 5 weight percent. For example, the amount can be in a range of 1 to 20, 1 to 15, 1 to 10, or 1 to 5 based on the total weight of the curable composition.

In some embodiments, the amount of the ionic liquid relative to the sum of ionic liquid and epoxy resin is in a range of 0.5 to 20 weight percent based on a total weight of the curable composition. The amount can be at least 0.5, at least 1, at least 2, at least 3, at least 4, or at least 5 weight percent and up to 20, up to 18, up to 15, up to 12, up to 10, up to 8, up to 6, or up to 5 weight percent. For example, the amount can be in a range of 1 to 20, 1 to 15, 1 to 10, or 1 to 5 based on the total weight of the ionic liquid and epoxy resin.

The ionic liquid facilitates the debonding of the cured adhesive from a substrate at the end of the useful life of an article containing the cured adhesive. In particular, the ionic liquid facilitates the removal of the cured adhesive from a metal-containing substrate such as, for example, an electronic component. This allows the metal substrate (e.g., electronic component) to be reused at the end of the useful life of an article.

In some embodiments, the Tensile Push Out or Dynamic Shear Peak Stress reduces by at least 50, 60, 70, 80, 90 or 95% after 2, 3, 4, or 5 min at 50 volts (e.g. according to the test method described in the examples). Other voltages could be utilized such as at least 10, 20, 30, or 40 volts ranging up to 120 volts or 240 volts.

Optional Organic Solvents

While the presence of organic solvents is often avoided, an optional organic solvent can be present in the curable compositions. Suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, ethylene glycol alkyl ether, propylene carbonate, and mixtures thereof. The organic solvent can be added to dissolve a reactant in the curable composition, can be added to lower the viscosity of the curable composition to facilitate its coating, printing or dispensing, or can be a residue from the preparation of the (meth)acrylate copolymer having pendant (meth)acryloyl groups. The amount of the organic solvent in the curable composition can be in a range of 0 to 10 weight percent based on a total weight of the curable composition. In some embodiments, the amount is at least 0.5 weight percent, at least 1 weight percent, at least 2 weight percent, at least 3 weight percent, at least 4 weight percent and up to 10 weight percent, up to 9 weight percent, up to 8 weight percent, up to 7 weight percent, up to 6 weight percent, or up to 5 weight percent.

Optional Polyol

The curable composition can optionally include a polyol. The polyol is typically a polymeric material and is often a polyether polyol, polyester polyol, (meth)acrylic-based polyol, or a polycaprolactam polyol. When the curable composition comprises such polyols, the curable composition comprises polyether, polyester, or polycaprolactam polymer.

The polyols can function as a toughening agent and/or can retard the curing reaction of the curable composition. As a toughening agent, the presence of the polyol can increase the shear strength of the final cured composition. That is, the polyols can decrease the crosslink density and increase the elongation of the cured composition. Additionally, some polyols such as polyether polyols tend to increase the "open time" of the curable composition. As used herein, the term "open time" refers to the time after the curable composition has exposed to ultraviolet and/or visible radiation, during which the curable composition remains sufficiently uncured for bonding to another surface.

The open time of the curable composition is desirably at least 2 minutes after exposure to ultraviolet and/or visible radiation. In some embodiments, UV-A radiation is provided by LED lights with an energy dose of at least 3 or 6 ranging up to 9 J/cm$^2$. If one or both substrates that are being bonded together are transmissive for the radiation to which the curable composition is exposed, however, the open time is of no relevance because in that case the exposure to the radiation can be effected through the transmitting substrate after both substrates have been attached to each other through the blended filament composition. When both substrates of the assembly are opaque, the blended filament composition is often exposed to ultraviolet radiation prior to attaching the second substrate thereto. In this case, an open time of at least two minutes may be desirable to allow for suitable workability within the partially cured composition.

In many embodiments, the polyol is a polyether polyol having at least two or at least 3 hydroxyl groups. The polyether polyols are typically polyether diols such as polyoxyalkylene glycols. Some example polyoxyalkylene glycols include, but are not limited to, polyoxyethylene glycols, polyoxypropylene glycols, and polyoxybutylene glycols (which can also be referred to as poly(tetramethylene oxide) glycols or poly(tetrahydrofuran) glycol). Other suitable polyether polyols are polyether triols such as polyoxyalkylene triols. These triols can be derived from glycerol. Examples include, but are not limited to, polyoxyethylene triol and polyoxypropylene triol. The polyether polyol is typically miscible with or forms a macroscopically stable mixture with the other curable components such as the epoxy resin and any optional film-forming resin.

Suitable polytetramethylene oxide glycols include, for example, those commercially available under the trade designation POLYMEG from LyondellBasell, Inc. (Jackson, TN, USA), under the trade designation TERATHANE from Invista (Newark, DE, USA), and under the trade designation POLYTHF from BASF Corp. (Charlotte, NC, USA). Suitable polyoxypropylene polyols include those commercially available under the trade designation ARCOL from Bayer Material Science (Los Angeles, CA, USA).

Still other polyether polyols are commercially available under the trade designation VORANOL from Dow Chemical Company (Midland, MI, USA) and under the trade designation DESMOPHEN from Covestro (Leverkusen, Germany) such as DESMOPHEN 550U, 1600U, 1900U, and 1950U. Additional polyether polyols are available under the trade designation CARBOWAX from Dow Chemical Company.

Suitable polyester polyols are commercially available under the trade designation DESMOPHEN from Covestro (Leverkusen, Germany) such as DEMMOPHEN 631A, 650A, 651A, 670A, 680, 110, and 1150. Other polyester polyols that are available under the trade designation DYNAPOL from Evonik Corporation (Essen, North Rhine-Westphalia, Germany) that can be linear and saturated, semi-crystalline or amorphous.

Suitable (meth)acrylate-based polyols are commercially available under the trade designation DESMOPHEN from Covestro (Leverkusen, Germany) such as DESMOPHEN A160SN, A575, and A450BA/A.

Suitable polycaprolactone polyols are commercially available from Dow Chemical Company (Midland, MI, USA) under the trade designation TONE and from Ingevity (North Charleston, SC, USA) under the trade designation CAPA.

The polyols can be characterized by their hydroxyl number, which refers to milligrams of KOH per gram of hydroxyl-containing material. This can be determined, for example, by adding an excess of an acidic material that reacts with the polyol and then by back titrating the remaining acidic material with a base to determine the amount of hydroxyl groups per gram of the polyol. The amount of hydroxyl groups is reported as though they were from the basic material KOH. The hydroxyl number (mg KOH per gram of polyol) is usually at least 10, at least 25, at least 50, at least 75, at least 100, at least 125, at least 150, at least 175, or at least 200 and can be up to 700, up to 650, up to 600, up to 550, up to 500, up to 450, up to 400, up to 350, up to 300, or up to 250.

In some embodiments, the polyol is a liquid at room temperature. In other embodiments, the polyether polyol is a liquid at temperatures above 40° C. The polyols that are not liquids at room temperature are often soluble in the other curable components or can be dissolved, if necessary, in an optional organic solvent. The weight average molecular weight can be up to 50,000 Daltons, up to 40,000 Daltons, up to 20,000 Daltons, up to 10,000 Daltons, or up to 5,000 Daltons. For example, the weight average molecular weight is often at least 100 Daltons, at least 500 Daltons, at least 750 Daltons, at least 1,000 Daltons, at least 1,500 Daltons, or at least 2,000 Daltons. In some embodiments, the polyether polyol has a weight average molecular weight in a range of 100 to 50,000 Daltons.

In many embodiments, the curable composition contains at least 1 weight percent of the polyol based on the total weight of the curable components in the curable composition. If there is too little polyol, the curable composition may cure (polymerize) too rapidly and there may be insufficient open time after activation of the photoacid generator and positioning a second substrate adjacent to the activated curable composition. That is, the structural strength of the bond between the first substrate and the second substrate (or different portion of the first substrate) may be compromised. Further, if there is not enough polyol, the toughness of the cured composition may not be adequate. The amount of the polyol can be in a range of 0 to 30 weight percent based on the total weight of curable components in the curable composition. If the amount of the polyol is too great, however, it may phase separate, the curable composition may not be a semi-solid, and the cured composition may have inadequate strength.

In many embodiments, the amount of the optional polyol is at least 1 weight percent, at least 2 weight percent, at least 3 weight percent, at least 4 weight percent, or at least 5 weight percent based on a total weight of the curable components in the curable composition. The amount the polyether polyol is often up to 30 weight percent, up to 25 weight percent, up to 20 weight percent, up to 18 weight percent, up to 15 weight percent, up to 12 weight percent, or up to 10 weight percent based on a total weight of the curable components. In some embodiments, the curable composition contains 0 to 30 weight percent, 1 to 30 weight percent, 1 to 25 weight percent, 1 to 20 weight percent, 1 to 15 weight percent, 2 to 25 weight percent, 2 to 20 weight percent, 2 to 15 weight percent, 4 to 25 weight percent, 4 to 20 weight percent, 4 to 15 weight percent, 5 to 25 weight percent, 5 to 20 weight percent, 5 to 15 weight percent, 8 to 25 weight percent, 8 to 20 weight percent, 8 to 15 weight percent, 10 to 25 weight percent, 10 to 20 weight percent, or 10 to 15 weight percent.

Optional Silica

Many curable compositions include optional silica particles. Silica is a thixotropic agent and is added to provide shear thinning. Silica has the effect of lowering the viscosity of the curable composition when force (shear) is applied. When no force (shear) is applied, however, the viscosity seems higher. That is, the shear viscosity is lower than the resting viscosity.

The silica particles typically have a longest average dimension that is less than 500 nanometers, less than 400 nanometers, less than 300 nanometers, less than 200 nanometers, or less than 100 nanometers. The silica particles often have a longest average dimension that is at least 5 nanometers, at least 10 nanometers, at least 20 nanometers, or at least 50 nanometers. In some embodiments, the silica particles are fumed silica. In other embodiments, the silica particles are non-aggregated nanoparticles.

The amount of the optional silica particles is at least 0.5 weight percent based on a total weight of the curable composition. The amount of the silica can be at least 1, at least 1.5, or at least 2 weight percent and can be up to 10, up to 8, or up to 5 weight percent. For example, the amount of silica can be in a range of 0.5 to 10 weight percent, 1 to 10 weight percent, 0.5 to 8 weight percent, 1 to 8 weight percent, 0.5 to 5 weight percent, or 1 to 5 weight percent.

Optional Silanes

Various silane compounds can be included in the curable composition. The silane can be added to promote adhesion to the first substrate and/or the second substrate that are bonded together with the cured composition. The silane groups have a silyl group that is particularly effective for increasing the adhesion to substrates having hydroxyl groups such as, for example, glass or ceramic surfaces. The silyl groups are often of formula —$Si(R^8)_x(OR^9)_{3-x}$ where each $R^8$ and each $R^9$ is independently an alkyl. Suitable alkyl groups for $R^8$ and $R^9$ often have 1 to 6 carbon atoms, 1 to 4 carbon atoms, or 1 to 3 carbon atoms. The variable x is 0, 1, or 2. The silyl group has at least one alkoxy group that can undergo hydrolysis and react with a siliceous surface.

The silane can be a hydrophobic or hydrophilic. That is, the silane can be of formula $R^{10}$—$Si(R^8)_x(OR)_{3-x}$ where $R^{10}$ can be a hydrophobic or hydrophilic group. Any hydrophobic or hydrophilic group can be used provided it does not interfere with the cationic polymerization of the epoxy resin. That is, $R^{10}$ usually lacks a nitrogen-containing group. In some embodiments, the silane is a hydrophilic silane and group $R^{10}$ can react with one of the components of the curable composition such as with a group on the (meth) acrylate copolymer. Such a reaction can result in the covalent attachment of the silane to the cured composition. For example, some silanes are glycidyl ether silanes where $R^{10}$ contains a glycidyl group. Examples of such silanes include, but are not limited to, (3-glycidyloxypropyl)trimethoxysilane.

The amount of the optional silane is often in a range of 0 to 10 weight percent based on a total weight of the curable composition. The amount can be at least 0.1, at least 0.2, at least 0.3, at least 0.5, or at least 1 weight percent and up to 10, up to 8, up to 6, up to 5, up to 4, up to 3, or up to 2 weight percent. For example, the amount can be in a range of 0.1 to 10, 0 to 8, 0.1 to 8, 0 to 6, 0.1 to 6, 0 to 4, 0.1 to 4, 0 to 2, or 0.1 to 2 weight percent.

Still Other Optional Components

Still other optional components include, for example, fillers, stabilizers, plasticizers, tackifiers, flow control agents, cure rate retarders, adhesion promoters (for example, titanates), impact modifiers, expandable microspheres, glass beads or bubbles, thermally conductive particles (e.g., alumina), electrically conductive particles, glass, clay, talc, pigments, colorants, and antioxidants. The optional components can be added, for example, to reduce the weight of the semi-structural or structural adhesive layer, to adjust the viscosity, to provide additional reinforcement, to modify the thermal or conductive properties, to alter the rate of curing, and the like. If any of these optional components are present, they are typically used in an amount that does not prevent the printing or dispensing of the curable composition.

In many embodiments, the curable compositions are free or substantially free of fiber reinforcement. As used herein, "substantially free" means that the curable compositions contain no greater than 1 weight percent, no greater than 0.5 weight percent, no greater than 0.2 weight percent, no greater than 0.1 weight percent, no greater than 0.05 weight percent, or no greater than 0.01 weight percent of fibers.

Method of Forming the Curable Composition

Although any suitable method can be used to prepare the curable composition, in many embodiments a precursor composition is formed initially. The precursor composition of the curable composition contains at least the polymerizable composition for formation of the statistical (meth) acrylic-based copolymer. It often additionally contains the (meth)acrylic-based triblock copolymer. The formation of the precursor composition, which is usually a syrup, is useful in minimizing the amount of organic solvent that is needed to form a homogeneous mixture of the components included in the curable composition. The syrup contains a polymeric material dissolved in monomers. That is, it contains a solute polymer and solvent monomers.

In some first embodiments of forming a syrup for the precursor composition, the solute polymer in the syrup is the (meth)acrylic-based multiblock copolymer, which is typically a (meth)acrylic-based triblock copolymer. In this first embodiment, the solute monomers are the monomers that will be used to form the statistical (meth)acrylic-based copolymer. More particularly, the solute monomers include an alkyl (meth)acrylate and other optional monomers or macromers.

In some second embodiments of forming a syrup for the precursor composition, the solute polymer includes a partially polymerized reaction product of at least some of the monomers used to form the statistical (meth)acrylic-based copolymer. In this second embodiment, the solute polymer is typically prepared from the alkyl (meth)acrylate monomers and optional monomers. In some examples, any macromer included in the statistical (meth)acrylic-based copolymer is not present when the syrup polymer is prepared but is added after preparation of the syrup polymer. The (meth) acrylic-based block copolymer can be present when the syrup is formed or added after its formation.

The syrups of the second embodiment can be formed using a free radical initiator, which can be either a thermal initiator or a photoinitiator. Any of the thermal initiators and photoinitiators described above for preparation of the statistical (meth)acrylic-based copolymer can be used. The extent of this reaction can be controlled by monitoring the viscosity of the syrup. For example, the reaction can be terminated when the viscosity reaches about 1000 centipoise. The reaction is halted by lowering the temperature or removing the light source for activating the initiator.

In some embodiments, the syrups of the second embodiment are formed using photoinitiators that can be activated by exposure to UV radiation at wavelengths less than 380 manometers (nm) such as in a range of 300 to less than 380 nm. For example, the free radical initiators can be activated at wavelength between 300 and 370 nm, between 330 and 370 nm, between 350 and 370 nm, or near 365 nm. One such photoinitiator is 2,2-dimethoxy-2-phenylacetophenone, obtained under the trade designation, "IRGACURE 651" from BASF (Florham Park, NJ, USA).

The syrup from either the first or second embodiment is combined with the other components of the curable composition (e.g., the epoxy resin, the photoacid generator, the ionic liquid, and the (meth)acrylic-based multiblock copolymer if it is not present in the syrup, and additional monomers for formation of the statistical (meth)acrylic-based block copolymer that are not present in the syrup). Further, a free radical initiator such as those mentioned above for formation of the (meth)acrylic copolymer can be added. The added free radical initiator is often a phosphine oxide such as phenyl bis(2,4,6-trimethylbenzoyl)phosphine oxide (commercially available under the trade designation, "IRGACURE 819" from BASF). These free radical photoinitiators can be activated by exposure to a first actinic light source. This activation results in the polymerization of the solute monomers in the syrup (e.g., the polymerization of any ethylenically unsaturated monomers and/or macromers in the precursor composition). The reaction product is the curable composition. To avoid inadvertently triggering both the free radical photoinitiator used to form the statistical (meth)acrylic-based copolymer and the photoacid generator for polymerizing the epoxy resin simultaneously, the first actinic light source is selected so that it emits over wavelengths that are not significantly absorbed by the photoacid generator.

The first actinic light source is selected to produce produces a spectral output with a peak intensity at a first wavelength that is at least 380 nanometers (nm), at least 383 nm, at least 386 nm, at least 390 nm, or at least 393 nm. The peak intensity of the first actinic light source can be at a wavelength of up to 420 nm, up to 419 nm, up to 418 nm, up to 417 nm, or up to 416 nm. The excitation dose used to activate the photoinitiator can be at least 200 mJ/cm$^2$, at least 400 mJ/cm$^2$, at least 600 mJ/cm$^2$, at least 800 mJ/cm$^2$, at least 1000 mJ/cm$^2$, at least 1500 mJ/cm$^2$, or at least 2000 mJ/cm$^2$. The excitation dose can be up to 6400 mJ/cm$^2$, up to 6000 mJ/cm$^2$, 5000 mJ/cm$^2$, up to 4000 mJ/cm$^2$, up to 3000 mJ/cm$^2$, up to 2500 mJ/cm$^2$, or up to 2000 mJ/cm$^2$.

One useful class of first actinic light sources are light emitting diodes ("LED"). LED-based ultraviolet (UV) sources are advantageous because they provide UV light over a much narrower wavelength range compared with other UV light sources such as black lights and mercury lamps. LED sources are commercially available that emit radiation, for example, at 395 nm or 405 nm.

Prior to exposure to the first wavelength of actinic radiation, the precursor composition can be applied onto a first substrate (or, alternatively, a first release liner). In many embodiments, the precursor composition is coated onto a release liner prior to exposure to the first wavelength of ultraviolet radiation. Upon exposure to the first wavelength of actinic radiation, the precursor composition undergoes a free radical polymerization reaction resulting in the formation of the statistical (meth)acrylic-based copolymer. The reaction product is a curable composition disposed on the release liner. The curable composition includes (1) the (meth)acrylic multiblock copolymer, (2) the statistical (meth)acrylic-based copolymer, (3) the epoxy resin, (4) the photoacid generator, and (5) the ionic liquid.

The curable composition may, in some cases, be subjected to sustained levels of stress that can induce creep and/or oozing under ambient conditions. Sources of such stress can include, for example, roll winding tensions or stacking weight. After exposure to the first actinic light source, the curable composition can be stored for an extended time with a minimal amount of creep and/or oozing. The curable composition is rendered dimensionally stable by the combined presence of the (meth)acrylic-based multiblock copolymer, which can form physical crosslinks, and the statistical (meth)acrylic-based copolymer, which can be chemically crosslinked.

Because of the shelf life of the curable composition, an article that contains the curable composition adhered to the first substrate or on a release liner can be prepared by a manufacturer. A customer can subsequently irradiate the curable composition with a second wavelength of light and position the irradiated composition adjacent to a second substrate. That is, the final curing step is done by the customer. If the partially curable composition is on a release liner, the release liner can be removed, and the curable composition attached to a first substrate prior to exposure to the second wavelength of actinic radiation.

The curable composition often functions as a pressure-sensitive adhesive. In some embodiments, the curable composition is positioned between a first release liner and a second release liner. The first release liner can be removed for placement of the curable composition adjacent to a first substrate while the second substrate can be removed for placement of the curable composition adjacent to a second substrate.

Cured Compositions and Methods of Forming the Cured Compositions

The cured composition is a polymerized reaction product of the curable composition. The cured composition typically contains a film forming polymeric material such as (meth)acrylic-based multiblock copolymer and/or statistical (meth)acrylic-based copolymer, and a polymerized (cured) epoxy resin.

When the composition comprises a film forming polymeric material, the curable composition is typically a pressure-sensitive adhesive, it can adhere to various substrates. In many embodiments, the curable composition is positioned adjacent to a first substrate. The curable composition can then be exposed to a second wavelength of actinic radiation to commence curing of the epoxy resin. After exposure to the second wavelength of actinic radiation, the curable composition is positioned adjacent to a second substrate. That is, the curable composition is positioned between the first substrate and the second substrate. Until curing is complete, the curable composition can adhere both substrates together by functioning as a pressure-sensitive adhesive. Upon curing, the first substrate can be bonded to the second substrate through the cured composition. The cure composition is typically a semi-structural or structural adhesive. If desired, the curable composition can be readily positioned adjacent to a second substrate such that the second substrate is adhered to the first substrate by the curable composition. That is, the curable composition, which is a pressure-sensitive adhesive, can be positioned between the first substrate and the second substrate and adheres to both substrates.

Often, the curable composition is exposed to a second wavelength of light to activate the photoacid generator prior to being positioned adjacent to the second substrate. The term "second wavelength of actinic radiation" or similar terms can refer to a single wavelength or to a distribution of wavelengths that activate the photoacid generator. The second wavelength is from a second light source that produces a spectral output with a peak intensity at a second wavelength that is different than the first wavelength. The photoacid generator preferentially absorbs radiation emitted by the second actinic light source relative to radiation emitted by the first actinic light source. That is, the photoacid generator preferentially absorbs little or no radiation emitted by the first actinic light source.

In many embodiments, the second wavelength is shorter than the first wavelength. Like the first light source, the second light source often has a controlled spectral output where the distribution of wavelengths is relatively narrow (or "substantially monochromatic") and centered about a characteristic second wavelength, such as a wavelength corresponding to a peak intensity. This is not critical, however, and other distributions of wavelengths, including polymodal distributions, may be feasible.

The second wavelength is selected to activate the photoacid generator in the second curable composition. These compounds generate an acid when activated. In many embodiments, the second wavelength is at least 200 nm, at least 250 nm, at least 300 nm, at least 330 nm, or at least 356 nm, or at least 365. The second wavelength can be less than 380 nm, up to 377 nm, or up to 374 nm.

Since the reaction of the curable composition occurs after forming the statistical (meth)acrylic-based copolymer from the precursor composition, the characteristics of second actinic light need not be as restrictive as those of the first actinic light source. The second actinic light source can be based on an LED source, as described earlier. Alternatively, the second actinic light source can be a UV black light, mercury lamp, or another broad-spectrum light source.

A UV black light is a relatively low light intensity source that provides generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., Sterling, VA) over a wavelength range of 280 nm to 400 nm.

A mercury lamp is a higher intensity broad-spectrum UV source capable of providing intensities generally greater than 10 mW/cm$^2$, and preferably between 15 and 6000 mW/cm$^2$. For example, an intensity of 600 mW/cm$^2$ and an exposure time of about 1 second may be used successfully. Intensities can range from 0.1 mW/cm$^2$ to 6000 mW/cm$^2$ and preferably from 0.5 mW/cm$^2$ to 3000 mW/cm$^2$.

Where generally monochromatic light sources are used, the first and second actinic light sources can be selected to operate at different wavelengths; for example, they can have respective peak intensities at wavelengths separated by at least 10 nanometers, at least 15 nanometers, at least 20 nanometers, at least 25 nanometers, or at least 35 nanometers. The first and second actinic light sources can have respective peak intensities at wavelengths separated by up to 100 nanometers, up to 80 nanometers, up to 60 nanometers, up to 50 nanometers, or up to 45 nanometers.

When the curable composition is exposed to the second wavelength of actinic radiation, the epoxy resin is polymerized. The cured composition contains reaction product of the curable composition. Additionally, exposure to the second wavelength of light can induces covalent bonding between functional groups (e.g., hydroxyl groups) of the statistical (meth)acrylic-based copolymer and the epoxy resin). In this manner, the cured composition can be covalently bonded together various polymers that were in the curable composition.

The amount of time required to form a functional semi-structural or structural bond following irradiation with the second actinic light source can be at least 1 minute, at least 2 minutes, at least 5 minutes, at least 10 minutes, at least 20 minutes, at least 30 minutes, at least 1 hour, at least 2 hours, at least 4 hours, at least 8 hours, at least 12 hours, at least 18 hours, or at least 24 hours. In some cases, the periods of time specified above may be achieved by heating the adhesive composition.

Until it is fully cured, the curable composition comprising film forming polymeric material usually and preferably has the properties of a pressure-sensitive adhesive. It is preferable that the pressure-sensitive adhesive has sufficient tack and dimensional stability to obviate the use of a clamp or other mechanism to secure the first substrate to the second substrate for the entirety of the second curing reaction. Often, a clamp or other mechanism is used in the early stages of curing the second curable composition to ensure that it adequately wets the surface to which it is adhered.

The cured composition can be characterized by various properties. In some embodiments, the Tensile Push Out peak stress is at least 1, 1.5, 2, 2.50, or 3 MPa. In some embodiments, the Tensile Push Out peak stress is no greater than 20, 15, 10, or 5 MPa. In some embodiments, the Dynamic Shear peak stress is at least 1, 1.5, 2, 2.50, or 3 MPa. In some embodiments, the Dynamic Shear peak stress is no greater than 10, 9, 8, 7, 6, 5, 4, 3, or 2 MPa.

Articles

Various articles are provided. A first article includes the curable composition and at least one substrate or release liner. The second article includes a cured composition positioned between two substrates such that a first substrate is bonded to a second substrate.

The first article includes the curable composition and either a first substrate or a first release liner positioned adjacent to the first substrate or to the first release liner. The curable composition is the same as described above. Some first articles include the curable composition and a first substrate positioned adjacent to the curable composition. Optionally, a release liner can be on a surface of the curable composition opposite the first substrate. Other first articles include the curable composition and a first release liner positioned adjacent to the curable composition. Optionally, a second release liner can be on a surface of the curable composition opposite the first release liner.

Where the first substrate is flexible or where the first substrate is absent (e.g., where the article includes a first release liner and an optional second release liner), the first article can be in the form of a roll. In some rolls, there are two release liners on opposite surfaces of the curable composition. In other rolls, there is a single release liner. The articles with either one or two release liners can be transfer adhesive tapes. There articles are often die-cut parts having a shape and size consistent with the intended use of the curable composition.

In some embodiments, the article containing the curable composition can be stored adjacent to at least one release liner for any desired amount of time such as, for example, up to 1 week, up to 2 weeks, up to 1 month, up to 2 months, up to 4 months, up to 6 months, up to 8 months, up to 10 months, or up to 1 year.

The curable composition in the first article is a pressure-sensitive adhesive. In some embodiments, the first article is an adhesive transfer tape. In many embodiments, the first article does not need to be reinforced with fibers as described, for example, in U.S. Patent Application Publication 2002/0182955 (Weglewski et al.).

A second article includes a first substrate, a second substrate, and a cured composition positioned between the first substrate and the second substrate. The cured composition, which is the same as described above, bonds the first substrate to the second substrate. The curable composition of the first article can have a with excellent ooze resistance yet can be used to form a second article that contains a cured composition that can function as a semi-structural adhesive with good impact resistance. The cured composition in the second article can be de-bonded, if desired, to the cured compositions can be removed (e.g., de-bonded) from the various surfaces of the second article after the useful lifetime of the article, to correct misplacement of a part during manufacturing, or to repair the article such as an electronic device.

Any suitable first substrate and second substrate can be used. Typically, at least one of the first substrate and the second substrate contains a metal and/or is electrically conductive. Either substrate can be flexible or inflexible. The substrates can be formed from a polymeric material, glass, ceramic material, metal (including various alloys), or combination thereof. In many embodiments, the first and/or second substrates are glass, ceramic materials, or metals. Suitable polymeric materials can be selected from a polymeric film or a plastic composite (e.g., glass or fiber filled plastics). The polymeric material can be prepared, for example, from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). A non-conductive substrate can be coated with a conductive layer, if desired.

Release liners can be used in the manufacture of the articles and function as temporary substrates. That is, the release liners are replaced with permanent substrates. Suitable release liners typically have low affinity for the curable composition. Exemplary release liners can be prepared from paper (e.g., Kraft paper) or other types of polymeric material. Some release liners are coated with an outer layer of a release agent such as a silicone-containing material or a fluorocarbon-containing material (e.g., polyfluoropolyether or polyfluoroethylene).

In some embodiments, the first substrate and the second substrate can be different components of an electronic device, a motorized vehicle, or a home appliance. For example, one of the substrates can be a polymeric display frame and the second substrate can be a polymeric or metallic housing within a phone, tablet, or other electronic device. Alternatively, the two substrates can be different components of a motorized vehicle, such as an automobile, truck, airplane, or the like, or different components of a home appliance, such as a refrigerator, dishwasher, oven, washing machine, or dryer. For example, one of the substrates can be glass (such as in a windshield or electronic display or shelf) and the second substrate can be a polymeric or metallic frame or bracket.

Provided at least one substrate can conduct electricity, the second article can be separated into its component parts by application of a direct current electric potential. For example, after the useful lifetime of the second article or when repair of the second article is needed, the first and second substrates can be separated from each other. In many embodiments, the cured composition can be cleanly removed from the substrates. This removal allows for reusing the substrates. This is particularly advantageous when the curable composition is attached to a first or second substrate that is or that contains an electronic component that can be reused or recycled.

The shape and form of the articles are not particularly limiting. An article can be a finished product or a part for incorporation into, or attachment to, another object. The article is typically made up of at least two components that may be adhesively bonded together, and the article may comprise two major surfaces that are nominally parallel to each other and a thickness in a direction orthogonal to the major surfaces (e.g., sheet or multilayer film) or be three-dimensional in shape (i.e. the major surface are not parallel and the thickness may vary). Similarly, the shape and form of the components making up the article are also not particularly limiting. A component can be a single element or a combination of elements, and the component may comprise two major surfaces that are nominally parallel to each other and a thickness in a direction orthogonal to the major surfaces (e.g., sheet or multilayer film) or be three-dimensional. In some embodiments, two or more components are interconnected, or even two different sections of the same material (e.g., one end of a composite strip of material can be folded over to adhere to the opposite end of the strip).

Debonding

To facilitate the separation of components (e.g., substrates) joined together by the cured composition (i.e., adhesive composition), a direct current (DC) electric potential is applied across the adhesive composition prior to separation of the components. For example, the electric potential may be applied across two electrically conductive components on opposite sides of the adhesive composition, such that the surface of one component serves as a negative electrode (or negative adhesive interface) and the surface of the other component serves as the positive electrode (or positive adhesive interface). Alternatively, the electric potential may be applied across one electrically conductive component and an electrically conductive adhesive carrier of a two-sided tape, where the surface of the conductive component or the conductive adhesive carrier serves as the negative adhesive interface and the other of the surface of the conductive component or conductive adhesive carrier serves as the positive adhesive interface. Application of a DC current typically weakens the adhesive bond at the negative electrode-adhesive interface, thus reducing the amount of force required to separate components in the article. The location of debonding can be reversed by simply changing the polarity of the electric potential.

FIG. 1 illustrates one embodiment of an article of the present disclosure comprising two electrically conducting components joined together by the adhesive composition. With reference to FIG. 1A, article 10 comprises a first component 12 having a first electrically conductive surface 14 and a second component 22 having a second electrically conductive surface 24. The first and second components 12, 22 are each made from electrically conductive material(s). The nature of the conductive materials is not particularly limiting. In some embodiments, the first electrically conductive surface 14 and second electrically conductive surface 24 are each selected from the group consisting of a metal, a mixed metal, an alloy, a metal oxide, a composite metal, a conductive plastic, a conductive polymer, or combinations thereof. In some embodiments, the composition of the first electrically conductive surface 14 is different from the composition of the second electrically conductive surface 24. In other embodiments, the compositions of the first and second electrically conductive surfaces 14, 24 are the same.

The adhesive composition 30 joins the first and second components 12 and 22 together at the first conductive surface 14 and the second conductive surface 24. The adhesive composition exhibits on-demand debonding behavior by application of a DC electric potential across the adhesive composition 30. In this embodiment, the first conductive surface 14 serves as the positive adhesive interface and the second conductive surface 24 serves as the negative adhesive interface. Application of a DC electric potential 40 across the adhesive composition 30 results in a weakening of the adhesive bond at the negative adhesive interface (i.e. the second conductive surface 24), as measured, for example, according to the work of adhesion per surface area, thus making it easier to separate the second component 22 from the first component 12. Preferably, little-to-no adhesive residue remains on the second conductive surface 24 after separation. In some embodiments, less than 10%, less than 5%, or less than 1% of the adhesive composition (by weight) remains on the second component 22 after separation. In some preferred embodiments, no adhesive composition remains on the second component 22 after separation. In some embodiments, it is possible to reuse the adhesive composition allowing the first component 12 to be rejoined to the second component 22 or adhered to a completely different component or article. If it is desirable that the adhesive remain on the second component 22 after separation, the polarity of the DC electric potential can be reversed so that the first conducting surface 14 serves as the negative adhesive interface.

Figure 1B:
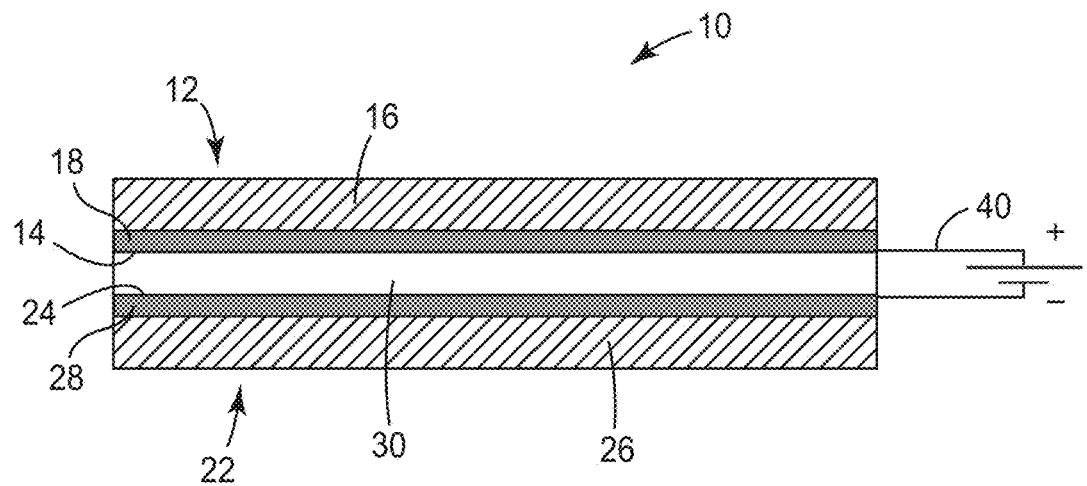
FIG. 1B is a schematic side view of a variation on the article in FIG. 1A.

Electrically conductive components include those components made entirely from electrically conducting material(s), as illustrated in FIG. 1A, as well as those components made from nonconducting material(s) coated with electrically conductive material(s), as illustrated in FIG. 1B. With reference to FIG. 1B, the first component 12 comprises a first nonconductive material 16 and a first electrically conductive coating 18 to provide the first electrically conductive surface 14. Similarly, the second component 22 comprises a second nonconductive material 26 and a second electrically conductive coating 28 to provide the second electrically conductive surface 24. Alternatively (not shown), one of the components could be made entirely of electrically conducting material(s) and the other component could be made of nonconducting material(s) coated with electrically conductive material(s). The conductive coating may only partially coat the component, as illustrated in FIG. 1B, or completely coat the outside surface of the component. For purposes of this disclosure, it is only necessary that the surface of the component in direct contact with the adhesive composition be sufficiently coated to weaken the adhesive bond at the negative adhesive interface when a DC electric potential is applied across the adhesive composition. In some embodiments, the coating is a solid layer. In other embodiments, the coating is pattern coated onto the surface of the component. As noted above, the electrically conductive material is not particularly limiting and can include materials selected from the group consisting of a metal, a mixed metal, an alloy, a metal oxide, a composite metal, a conductive plastic, a conductive polymer, or combinations thereof.

The adhesive composition 30 in FIG. 1B joins the first and second components 12 and 22 together. The first conductive surface 14 serves as the positive adhesive interface and the second conductive surface 24 serves as the negative adhesive interface. Application of a DC electric potential 40 across the adhesive composition 30 results in a weakening of the adhesive bond at the negative adhesive interface (i.e., second electrically conductive surface 24), as measured, for example, according to the work of adhesion per surface area, thus making it easier to separate the second component 22 from the first component 12. If it is desirable that the adhesive composition remain predominately on the second component, the polarity of the DC electric potential can be reversed so that the first electrically conducting surface serves as the negative adhesive interface.

Figure 1C:
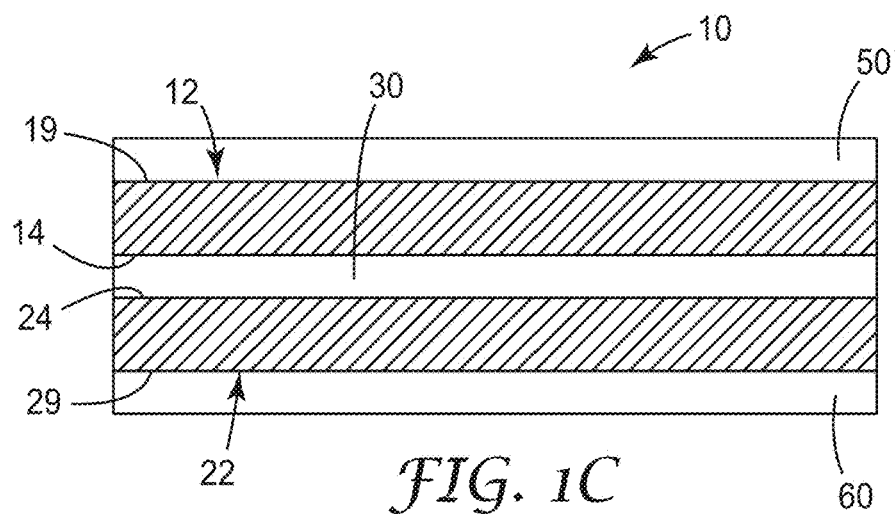
FIG. 1C is a schematic side view of another variation on the article in FIG. 1A.

The articles in FIG. 1A-B can be further adapted to join and subsequently de-bond (i.e., separate) nonconductive objects or elements using the adhesive composition, as illustrated in FIG. 1C. The article in FIG. 1C includes a conductive first component 12 having a first electrically conductive surface 14, and a conductive second component 22 having a second electrically conductive surface 24. The first and second components 12 and 22 are joined together by the adhesive composition 30. Although the first and second components can be made of electrically conductive material(s), it should also be understood that the first and/or second components can be made from nonconductive material(s) and coated with electrically conductive material(s), such as illustrated in FIG. 1B. FIG. 1C differs from FIGS. 1A and 1B in that a first outer adhesive 50 is added to a second side 19 of the first component 12 opposite the adhesive composition 30, and a second outer adhesive 60 is added to a first side 29 of the second component 22 opposite the adhesive composition 30. The outer adhesives 50 and 60 can be the same or different and are not particularly limiting, as long as the outer adhesives 50 and 60 bond to the nonconductive object or element and function for the intended application. In some embodiments, the outer adhesive is a pressure sensitive adhesive. In some further embodiments, the outer adhesive is the curable composition described herein. An optional release liner (not shown) may be applied to the first outer adhesive 50, the second outer adhesive 60, or both to protect the outer adhesives during transport and storage of the article. In some embodiments, a release liner is applied to each of the first and second outer adhesives. In other embodiments, a release liner is applied to one of the outer adhesives and the article is wound up on itself so that the other outer adhesive is in direct contact with the release agent of the release liner for the purpose of storage and transport. The adhesive composition can then be unrolled when ready for use. Release liners can be made, for example, of kraft papers, polyethylene, polypropylene, polyester, or composites of any of these materials. The liners are preferably coated with release agents such as fluorochemicals or silicones. In some preferred embodiments, the liners are papers, polyolefin films, or polyester films coated with silicone release materials. Examples of commercially available release liners include POLYSLIK silicone release papers available from Loparex (Cary, NC), Silicone 1750 coated films from Infiana (Forchheim, Germany), siliconized polyethylene terephthalate films available from H. P. Smith Co. (Stoneham, MA), and 3M SCOTCHPAK 9741 Release liner from 3M Company (St. Paul, MN).

In the embodiment illustrated in FIG. 1C, the first and second components comprise two major surfaces that are nominally parallel to each other and a thickness in a direction orthogonal to the major surfaces (e.g., sheet or multi-layer film). However, it is not necessary, and one can conceive of applications where either one or both components are three-dimensional (e.g., special mounting features such as shaped indentation in which to seat the nonconductive object). In practice, one of the optional release liners is removed from the first outer adhesive 50 and the first outer adhesive adhered to a nonconductive object. Then, the second optional release liner is removed from the second outer adhesive 60 and the second outer adhesive 60 adhered to a different nonconductive object, such that the nonconductive objects are adhesively joined. The nonconductive objects can be separated on-demand by application of an electric potential across the adhesive composition, as illustrated in FIGS. 1A-B. In this instance, separation will result in one nonconductive object having the first component adhesively bonded thereto and the other nonconductive object with the second component adhesively bonded thereto.

FIG. 2 illustrates another embodiment of an article 110 of the present application where the adhesive composition is a two-sided tape that joins the first and second components together.

Figure 2A:
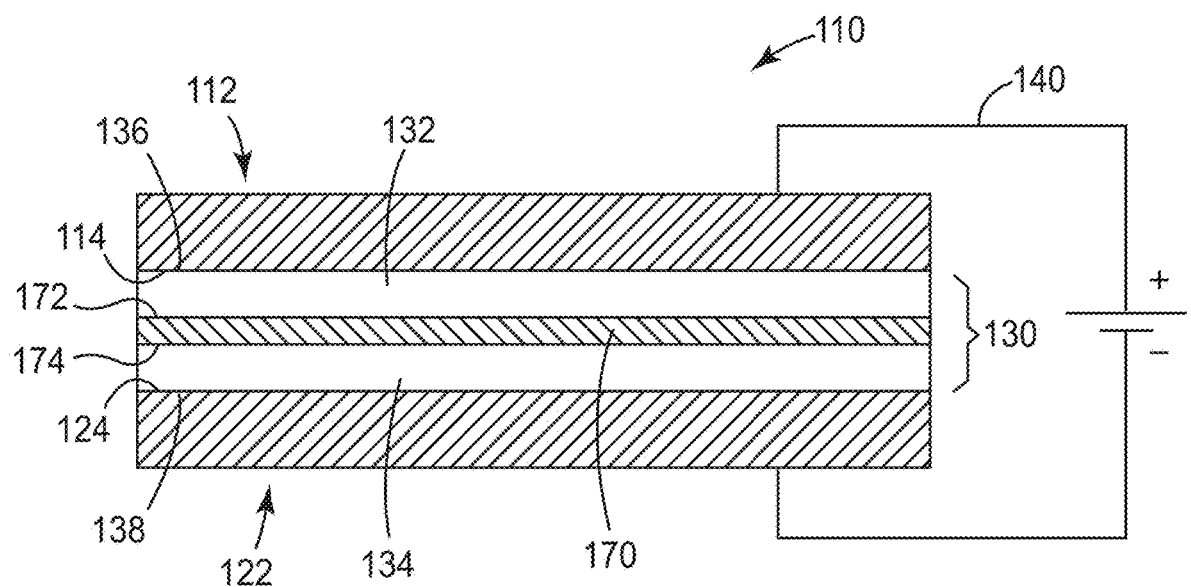
FIG. 2A is a schematic side view of another exemplary article of the present application.

With reference to FIG. 2A, the article 110 comprises a first component 112 having a first electrically conductive surface 114 and a second component 122 having a second electrically conductive surface 124. The first and second components can be made of conductive material(s), as illustrated in FIG. 2A, or one or both first and second components can be made of nonconductive material(s) and at least partially coated with electrically conductive material(s), as described above with respect to FIG. 1. The adhesive composition 130 is disposed between the first electrically conductive surface 114 and the second electrically conductive surface 124 and joins the first component 112 to the second component 122.

The adhesive composition 130 is a two-sided adhesive further comprising a carrier 170 having a first major surface 172 and a second major surface 174 opposite the first major surface. A first adhesive composition 132 is on the first major surface 172 of the carrier 170. Similarly, a second adhesive composition 134 is on the second major surface 174 of the carrier 170. In some embodiments, the composition of the first adhesive composition is the same as the second adhesive composition. In other embodiments, the composition of the first adhesive composition is different than the second adhesive composition. A surface 136 of the first adhesive composition 132 opposite the carrier 170 is in contact with the first conductive surface 114 of the first component 112. A surface 138 of the second adhesive composition 134 opposite the carrier 170 is in contact with the second conductive surface 124 of the second component 122.

In some embodiments, the carrier is a porous material that allows for physical contact between the first and second adhesive compositions. Exemplary carriers include paper, woven or nonwoven fabrics, a porous film, a metal mesh, a metal grid, or combinations thereof. In some embodiments, the carrier is electrically conductive. Such conductive carriers may be porous or nonporous and include a metal mesh, a metal grid, a metal foil, a metal plate, a conductive polymer, a conductive foam, a conductive tissue, or combinations thereof.

In one embodiment, the cured composition (e.g, of the adhesive tape first article) is intersected with a metal film and the second article (i.e. bonded by the first article) is arranged in the following order: first substrate or first release liner, cured composition, metal film, and cured composition.

In the embodiment illustrated in FIG. 2A, the first electrically conductive surface 114 serves as the positive adhesive interface and the second electrically conductive surface 124 serves as the negative adhesive interface. When the carrier is made from a porous material, application of a DC electric potential 140 across the adhesive composition 130 results in a weakening of the adhesive bond at the negative adhesive interface (i.e., second electrically conductive surface 124), as measured, for example, according to the work of adhesion per surface area, thus making it easier to separate the second component 122 from the first component 112. If it is desirable to separate the adhesive composition from the first component, the polarity of the DC electric potential can be reversed so that the first electrically conducting surface serves as the negative adhesive interface.

When the carrier in FIG. 2A is a nonporous conductive material, application of a DC electric potential 140 across the adhesive composition 130 can result in a weakening of the adhesive bond at the negative adhesive interface (i.e., second electrically conductive surface 124) and the first major surface 172 of the carrier 170.

In another embodiment, the carrier 170 is a conductive material that serves as either the positive or the negative adhesive interface during the debonding process. For example, with reference to FIG. 2B, the first conductive surface 114 of the first component 112 is the positive adhesive interface and the first major surface 172 of the carrier 170 is the negative adhesive interface. Application of a DC electric potential 140 across the first adhesive composition 132 will result in separation of the first and second components 112, 122 at the first major surface 172 of the carrier 170. Alternatively, the first component 112 can be removed from the first adhesive composition 132 by reversing the polarity of the DC electric potential.

In an additional embodiment, the conductive surface 124 of the second component 122 or the second major surface 174 of the carrier 170 can be the negative adhesive interface and the other of the conductive surface 124 of the second component 122 or the second major surface 174 of the carrier 170 can be the positive adhesive interface.

Figure 2B:
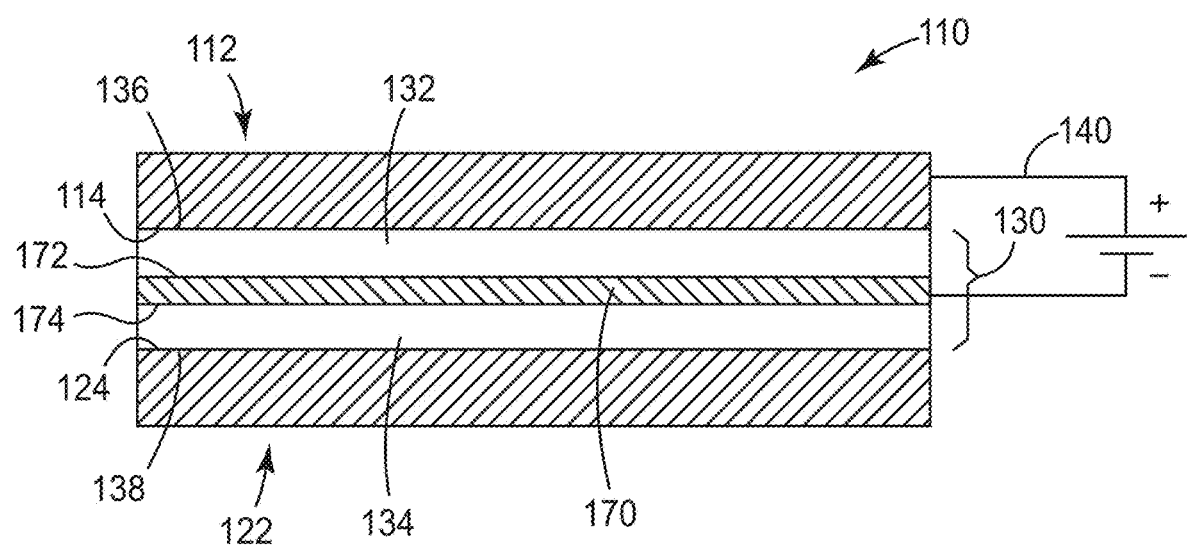
FIG. 2B is a schematic side view of a variation on the article in FIG. 2A.

It should be understood, with reference to FIG. 2B, that when the carrier 170 serves as the negative or positive adhesive interface and the first conductive surface 114 of the first component 112 serves as the other of the negative or positive adhesive interface, only the first adhesive composition 132 across which the DC electric potential is applied need comprise a cured composition that includes the ionic liquid. The second adhesive composition 134 can in fact be any type of adhesive. Similarly, when the carrier 170 serves as the negative or positive adhesive interface and the second conductive surface 124 of the second component 122 serves as the other of the negative or positive adhesive interface, only the second adhesive composition 134 across which the DC electric potential is applied need comprise a cured composition that includes the ionic liquid. The first adhesive composition 132 can be any type of adhesive. Therefore, in such embodiments, a two-sided tape may be used to make the article which comprises a carrier having adhesive on both sides, where only one of the adhesives comprises a cured composition that includes the ionic liquid. This construction would be similar to that illustrated in FIG. 1C, where the second component 22 is a carrier.

As shown above, a two-sided tape with a conductive carrier allows the user to strategically tailor the location of debonding within an article. This can be particularly advantageous when it is necessary to remove adhesive from a component prior to recycling and/or leave the adhesive on a component for repositioning or adherence to the same or different article.

Further, by using a two-sided tape with a conductive carrier, at least one of the components need not be conductive to separate the first component from the second component. The carrier can serve as one of the electrodes, thus increasing the types of materials that can be included in the article (i.e., adhering two conductive components or adhering a conductive component to a nonconductive component).

EXAMPLES

Unless otherwise noted or readily apparent from the context, all parts, percentages, ratios, etc. in the Examples and the rest of the specification are by weight.

TABLE 1

Materials Used in the Examples

| Abbreviation | Description |
|---|---|
| LA2330 | M-B-M acrylic triblock copolymer with a Mw = 110 kDa where M refers to poly(methyl methacrylate) and B refers to poly(butyl acylate), obtained under the trade designation "KURARITY LA2330" from Kuraray Co., Ltd., Tokyo, Japan |
| EPON 828 | Difunctional bisphenol A/epichlorohydrin derived epoxy resin with an equivalent weight of 185-192 grams/equivalent, obtained under the trade designation "EPON 828" from Hexion Inc., Columbus, Ohio, USA |
| EPON 1001F | solid epoxy resin derived from liquid epoxy resin and bisphenol-A, obtained under the trade designation "EPON 1001" from Hexion Inc., Columbus, Ohio, USA |
| Acclaim 2200 | 2,000 g/mol molecular weight diol based on propylene oxide available from Covestro, Leverkusen, Germany |
| Quintac 3620 | poly(styrene-b-isoprene-b-styrene) block copolymer with 15% styrene 12% SI diblock content, Melt Index of 9 g/10 min available from Zeon Chemicals, Kentucky, USA |
| OM 819 | Phenylbis(2,4,6-trimethylbenzoyl)phosphine oxide, obtained under the trade designation, "OMNIRAD 819" from iGM Resins, Charlotte, NC iGM Resins, Charlotte, NC |
| 2-MBA | 2-methylbutyl acrylate can be obtained from Monomer Polymer & Dajac Labs, Ambler, PA, USA |
| nBuA | n-butyl acrylate, obtained from BASF, Florham Park, New Jersey, USA |
| HEA | 2-hydroxyethyl acrylate obtained from BASF, Florham Park, New Jersey, USA |
| THFA | tetrahydrofurfuryl acrylate from San Esters, New York NY, Tg = 12° C. |
| E3A | 2-(2-ethoxyethoxy)ethyl acrylate from TCI, Tokyo, Japan |
| 2EHA | 2-ethylhexyl acrylate from BASF, Ludwigshafen Germany |
| HPPA | 2-hydroxy-3-phenoxypropyl acrylate from KOWA American Corporation, New York, NY, Tg = 17° C. |
| IBOA | Isobornyl acrylate from Chempoint, a Univar Company, Calumet City, IL. |
| MPEG-A 0.6 | Methoxy polyethylene glycol 550 acrylate (MPEG550A) having a number average molecular weight of 550 Da, obtained from Sans Esters, New York, New York, USA |
| HDDA | 1,6-hexanediol-diacrylate, obtained from Arkema, Colombes, France |
| BMI$^+$ TFSI | 1-butyl-3-methylimidazolium bis(trifluoromethanesulfonyl)imide, obtained from Sigma Aldrich, St. Louis, Missouri, USA |
| BMI$^+$ BF$_4^-$ | 1-butyl-3-methylimidazolium tetrafluoroborate, obtained from Sigma Aldrich, St. Louis, Missouri, USA |
| BMI$^+$ SbF$_6^-$ | 1-butyl-3-methylimidazolium hexafluoroantimonate, obtained from Sigma Aldrich, St. Louis, Missouri, USA |
| BMI$^+$ PF$_6^-$ | 1-butyl-3-methylimidazolium hexafluorophosphate, obtained from Sigma Aldrich, St. Louis, Missouri, USA |
| Ar$_3$S$^+$ PF$_6^-$ | Triarylsulfonium hexafluorophosphate salts in propylene carbonate (45 wt % solids), obtained under the trade designation "OMNICAT 432" from iGM Resins. |
| Ar$_3$S+ SbF$_6$ | Triarylsulfonium hexafluoroantimonate salts in propylene carbonate (50 wt % solids), obtained under the trade designation "OMNICAT 320" from iGM Resins. |
| RF02N | 2 mil thick PET (i.e., polyethylene terephthalate) release liner, obtained under product name RF02N from SKC, Seoul, Korea |
| RF12N | 2 mil thick PET release liner, obtained under product name RF12N from SKC, Seoul, Korea |
| D540/3 | Predominantly linear, flexible hydroxyl polyurethane with extremely high crystallization rate, obtained under trade designation "Desmocoll 540/3" from Covestro AG, Leverkusen, Germany Solution viscosity, 15% MEK at 23° C. = 1000-1500 cps |
| V-2200B | Thermoplastic aromatic linear saturated polyester resin obtained under the trade designation "Vitel 2200B" from Bostik, Colombes, France (Mw 47,5000, Mn 24,500) Tg 69° C. |
| B30HH | Poly(vinyl butyral) obtained under the trade designation "Mowital B30HH" from Kuraray, Tokyo, Japan |
| MEK | Methyl ethyl ketone, ACS grade, obtained from EMD Millipore Corporation, Burlington, MA, USA |
| LHT-240 | A 700-molecular weight polypropylene oxide-based triol obtained under the trade designation "Arcol LHT-240" from Covestro AG, Leverkusen, Germany |
| L3P PET | Laminate of Aluminum foil/polyester film/Aluminum obtained under trade designation Lenzingtex, 3 ply, 77041894 from Lenzing Plastics, Lenzing, Austria |

Test Methods

Dynamic Shear Strength

For dynamic shear testing, a modified version of 'ASTM D1002—Apparent Shear Strength of Single-Lap-Joint Adhesively Bonded Metal Specimen' was used. Curable adhesive samples were tested between the ends of two overlapped 304 stainless steel substrates (25.4 mm wide×101.6 mm long×1.6 mm thick), with an overlap adhesive bonded region of 25.4 mm×25.4 mm. To prepare bonded test specimens, 25.4 mm×25.4 mm square samples of the curable adhesives were cut that contained a layer of the adhesive composition between two release liners (RF02N and RF12N). The easy release liner (RF02N) was removed, and the curable adhesive was laminated at room temperature to the end of the first substrate. The tight liner (RF12N) was removed from the curable adhesive bonded to the first stainless steel substrate. The curable adhesive was exposed to 4 J/cm2 from a 365 nm UV-LED (Omnicure 7300, Excelitas Inc, Waltham, MA) and immediately afterwards the end of the second stainless steel substrate was applied to the adhesive area ensuring an overlap area of 25.4 mm×25.4 mm. The total UV energy was determined using a POWERPUCK II radiometer (available from EIT Incorporated, Sterling, Virginia, USA). The bonded laminate (cured adhesive between two stainless steel substrates) was then compressed with a 4 kg weight applied over the 25.4 mm×25.4 mm adhesive bonded area at room temperature for 30 seconds. The bonded test specimens were then compressed together over the bonded portion with binder clips (Large Size, Staples, Framingham, MA) for 300 seconds, before placing in an oven at 65° C. with the clips removed, for 30 minutes. The bonded test specimens were then dwelled at 23° C./50% relative humidity (RH) for 2 days before testing. The adhesive joint was tested by gripping the opposite ends of the two stainless steel substrates within an MTS CRITERION (Model C43, MTS, Eden Prairie, Minnesota, USA) and tested at a rate of displacement of 10 mm/min (vertical crosshead speed). The maximum peak in the stress of the stress strain curve was used to determine the peak stress of the cured adhesive specimen in MPa for Table 3.

Tensile Push-Out Strength

Figure 3:
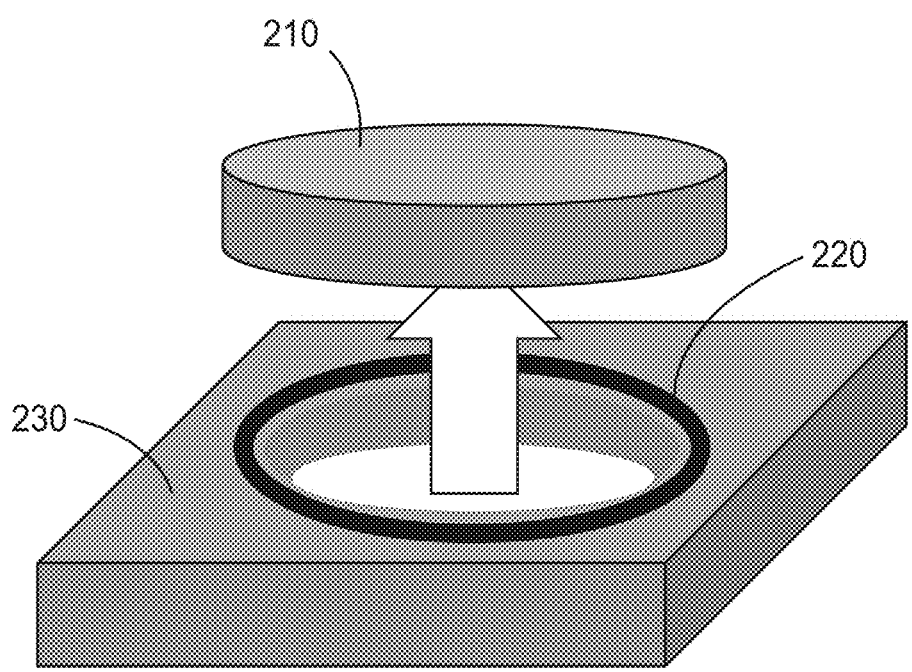
FIG. 3 is a diagram of the testing apparatus used for tensile push out testing.

The tensile pushout set up is shown in FIG. 3. A stainless steel (SS) square coupon 230 (40 mm×40 mm×3 mm) containing a circular hole (diameter of 24 mm) in the center and a circular stainless-steel puck 210 (diameter=33 mm, 3 mm thick) were adhered together using a ring-shaped die cut of curable adhesive 220 (outer diameter=31 mm, inner diameter=26 mm, 200 μm thick). The curable adhesive of the die cut was initially positioned between two release liners (RF02N and RF12N). The easy liner (RF02N) of the die cut was removed and the die cut was adhered symmetrically around the center hole of the SS coupon. The tight liner (RF12N) was then removed, and the curable adhesive was exposed to 4 J/cm2 from a 365 nm UV-LED (Omnicure 7300, Excelitas Inc, Waltham, MA) to initiate curing. The total UV energy was determined using a POWERPUCK II radiometer (available from EIT Incorporated, Sterling, Virginia, USA). The SS puck was then centered above the UV-activated adhesive die cut and adhered to the exposed adhesive surface with hand pressure. The assembly was then compressed with a 4 kg weight for 30 seconds at 23° C. The bonded test specimens were then compressed together over the bonded portion with binder clips (Large Size, Staples, Framingham, MA) for 300 seconds, before placing in an oven at 65° C. with the clips removed, for 30 minutes. The bonded test specimens were then dwelled at 23° C./50% relative humidity (RH) for 2 days before testing.

For electrically induced debonding, a BK Precision 1685 B power source (Yorba Linda, California, USA) was connected to the coupon and puck via a positive and negative electrode. For 180 or 300 seconds, a voltage (direct current electric potential) of 50 V was applied across the coupon and puck. Immediately after this time, the samples were disconnected from the power source electrodes and loaded onto an MTS CRITERION (Model C43, MTS, Eden Prairie, Minnesota, USA). The puck was pushed out from the coupon in the direction shown in FIG. 3 at a rate of 10 mm/min. The peak stress required to remove the puck from the coupon was recorded in MPa and the percentage reduction from the push out strength without an applied voltage was recorded and shown in Table 3. Samples where no voltage was applied were also tested in this way and the peak stress for these measurements are also reported in Table 3.

Molecular Weight by Size Exclusion Chromatography (SEC)

Submitted samples were analyzed by conventional SEC against polystyrene molecular weight standards. The solvent and eluent consisted of tetrahydrofuran (OMNISOLV grade, stabilized with 250 parts per million of butylated hydroxytoluene, from EMD Millipore Corporation (Burlington, MA, USA)). The SEC equipment consisted of a 1100 system (comprised of quaternary pump, autosampler, column compartment, differential refractive index detector) from Agilent Technologies (Santa Clara, CA, USA) operated at a flow rate of 1.0 mL/min using the eluent described above. The stationary phase consisted of PLgel MIXED-C+D columns (5 micrometer particle size, 7.5 mm internal diameter, 30 cm length each) from Agilent Technologies. The column compartment and differential refractive index detector were set to 40° C. The sample was prepared singly, and the preparation was injected in duplicate. The polymer content in the sample was assumed to be approximately 5 weight percent. A solution of approximate concentration 60 mg/mL (or approximately 3 mg/mL adjusted for polymer content) was prepared in a glass scintillation vial using the solvent described above. A 1 mL aliquot was filtered through a 0.45 mm PTFE syringe filter into an autosampler vial. The vial was tightly crimped with an aluminum cap and placed into the autosampler of the SEC system for analysis. The injection volume was set to 50 µL. The molecular weight standards were EasiCal Polystyrene from Agilent Technologies. The peak molecular weight values of the polystyrene molecular weight standards used in the calibration ranged from 2,403,000 to 580 g/mol. The molecular weight calibration curve was of order 3, $y=-0.003115x^3+0.1288x^2-2.178x+17.98$. The software used for data collection was OpenLAB CDS, ChemStation Edition for LC&MS Systems from Agilent Technologies. The software used for data analysis was Agilent GPC/SEC software (version A.02.01) from Agilent Technologies.

Glass Transition Temperature by Dynamic Mechanical Analysis

Rheological testing was performed using a TA Instruments discovery hybrid rheometer III (DHR-3), (New Castle, DE, USA) with 8-mm diameter parallel plates. The sample was mounted between the parallel plates (filling the plates entirely) and heated from room temperature up to 40° C. The sample was then subjected to a cooling temperature ramp from 40° C. to −50° C. at a rate of 3° C./min. Temperature was then set to 20° C. and then the sample was subjected to a heating temperature ramp from 20° C. to 140° C. at a rate of 3° C./min. Viscoelastic data of the sample were collected during both temperature ramp steps by applying an oscillatory rotational shear deformation at a frequency of 1 Hz with strain amplitude values in the linear viscoelastic regime (typically 1-5% or lower). The glass transition temperature (at 1 Hz) was determined as the peak of the tan(δ) curve from the rheology plot of G' and G" (y axis-1) versus temperature (° C.), (x axis) and tan(δ) (y axis-2). The peak (i.e., highest value) in tan(δ) was selected from y axis-2, and the corresponding temperature on the x axis was selected as the glass transition temperature. Tan(δ) is an abbreviation for the tangent of the phase angle between the stress and strain oscillation waves in the shear rheology oscillation plot.

Sample Preparation

Examples and Comparative Examples

Syrups SRP-1 and SRP-2 were made using LA2330/monomer mixtures, wherein SRP-1 comprises LA2330 in nBuA monomer (40 wt % by mass) and SRP-2 comprises LA2330 in 2-MBA monomer (30 wt % by mass). SRP-1 and SRP-2 were made by dissolving the LA2330 polymer in the respective monomer at the designated wt % solids at room temperature without further processing.

Transfer tape samples were made by combining the additive raw materials (RMs) and syrups at the appropriate parts per hundred resin (phr) loadings outlined in Tables 2A and 3 (raw material descriptions are in Table 1), whereby 100 phr of the syrup is used for Table 2A. The monomer-polymer/epoxy/initiator/cross-linker syrup mixtures were then coated between two release liners (RF12N and RF02N from SKC Haas, Seoul, Korea, 2 mil) at an adhesive thickness of 8 mils (200 µm) and the acrylic RMs of the tape were cured under 405 nm UV-LED lights with a total dosage of 2.8 J/cm$^2$ as measured with a POWER PUCK II radiometer equipped with a high power sensing head (available from EIT Incorporated, Sterling, VA).

The curable compositions are described in both Tables 2A and 2B. Table 2B is given in weight percent based on a total weight of the resin composition in the curable composition.

Table 3 contains characterization results for cured adhesives. The curing method used is described in the testing methods.

TABLE 2A

Curable Compositions (phr)

| Example | Syrup | MPEG-A | HEA | EPON 828 | IRG 819 | BMI+ TFSI− | BMI+ BF4− | BMI+ PF6− | BMI+ SbF6− | Ar3S+ PF6− | Ar3S+ SbF6− | HDDA |
|---|---|---|---|---|---|---|---|---|---|---|---|---|
| CE-A | SRP-1 | 10 | 10 | 50 | 0.2 | — | — | — | — | — | 1 | 0.15 |
| CE-B | SRP-2 | 10 | — | 50 | 0.2 | 5 | — | — | — | — | 1 | 0.15 |
| CE-C | SRP-2 | 10 | — | 50 | 0.2 | — | 5 | — | — | — | 1 | 0.15 |
| EX-1 | SRP-2 | 10 | 10 | 50 | 0.2 | — | — | 5 | — | — | 1 | 0.15 |
| EX-2 | SRP-2 | 10 | 10 | 50 | 0.2 | — | — | — | 10 | — | 1 | 0.15 |
| EX-3 | SRP-2 | — | 10 | 50 | 0.2 | — | — | — | 10 | — | 1 | 0.15 |
| EX-4 | SRP-2 | 10 | — | 50 | 0.2 | — | — | — | 10 | — | 1 | 0.15 |
| EX-5 | SRP-2 | — | 10 | 50 | 0.2 | — | — | 5 | — | 1 | — | 0.15 |
| EX-6 | SRP-2 | 5 | 10 | 50 | 0.2 | — | — | 5 | — | 1 | — | 0.15 |
| EX-7 | SRP-2 | 10 | 10 | 50 | 0.2 | — | — | 5 | — | 2 | — | 0.15 |
| EX-8 | SRP-2 | 5 | 10 | 50 | 0.2 | — | — | 10 | — | 2 | — | 0.15 |

TABLE 2B

Curable Composition (weight percent)

| Example | LA2330 | 2-MBA | nBuA | MPEG-A | HEA | EPON 828 | IRG 819 | BMI+ TFSI− | BMI+ BF4− | BMI+ PF6− | BMI+ SbF6− | Ar3S+ PF6− | Ar3S+ SbF6− | HDDA |
|---|---|---|---|---|---|---|---|---|---|---|---|---|---|---|
| CE-A | 23.34 | 0.00 | 35.02 | 5.84 | 5.84 | 29.18 | 0.12 | — | — | — | — | — | 0.58 | 0.09 |
| CE-B | 18.03 | 42.08 | — | 6.01 | — | 30.06 | 0.12 | 3.01 | — | — | — | — | 0.60 | 0.09 |
| CE-C | 18.03 | 42.08 | — | 6.01 | — | 30.06 | 0.12 | — | 3.01 | — | — | — | 0.60 | 0.09 |
| EX-1 | 17.01 | 39.69 | — | 5.67 | 5.67 | 28.35 | 0.11 | — | — | 2.84 | — | — | 0.57 | 0.08 |
| EX-2 | 16.54 | 38.60 | — | 5.51 | 5.51 | 27.57 | 0.11 | — | — | — | 5.51 | — | 0.55 | 0.08 |
| EX-3 | 17.51 | 40.85 | — | — | 5.84 | 29.18 | 0.12 | — | — | — | 5.84 | — | 0.58 | 0.09 |
| EX-4 | 17.51 | 40.85 | — | 5.84 | — | 29.18 | 0.12 | — | — | — | 5.84 | — | 0.58 | 0.09 |
| EX-5 | 18.03 | 42.08 | — | — | 6.01 | 30.06 | 0.12 | — | — | 3.01 | — | 0.60 | — | 0.09 |
| EX-6 | 17.51 | 40.85 | — | 2.92 | 5.84 | 29.18 | 0.12 | — | — | 2.92 | — | 0.58 | — | 0.09 |
| EX-7 | 16.92 | 39.47 | — | 5.64 | 5.64 | 28.19 | 0.11 | — | — | 2.82 | — | 1.13 | — | 0.08 |
| EX-8 | 16.92 | 39.47 | — | 2.82 | 5.64 | 28.19 | 0.11 | — | — | 5.64 | — | 1.13 | — | 0.08 |

TABLE 3

Test Results

| Example | Dynamic Shear, Cured at 365 nm | SS to SS Peak Stress (MPa) | Push Out Strength SS to SS (MPa) | Reduction After 50 V for 3 min | Reduction After 50 V for 5 min |
|---|---|---|---|---|---|
| CE-A | Y | 1.6 | 3.0 | | 0% |
| CE-B | N | NT | NT | NT | NT |
| CE-C | N | NT | NT | NT | NT |
| E1 | Y | 2.7 | 6.0 | | 83% |
| E2 | Y | 4.2 | 6.6 | 50% | |
| E3 | Y | 2.7 | 7.7 | 69% | |
| E4 | Y | 2.3 | 7.8 | 67% | |
| E5 | Y | 2.3 | 7.3 | | 73% |
| E6 | Y | 2.1 | 2.9 | 64% | |
| E7 | Y | 3.5 | 4.2 | 77% | |
| E8 | Y | 4.4 | 5.4 | 73% | |

NT = Not tested due to inability to cure and make a strong enough bond to test

TABLE 4

Monomers of acrylic syrups

| | | GRAMS | | | | | |
|---|---|---|---|---|---|---|---|
| Description | | OM651 | BA | THFA | E3A | IBOA | 2EHA |
| SRP-3 | 2EHA/THFA/IBOA (30/45/25) | 0.14 | | 45 | | 25 | 30 |
| SRP-4 | BA/E3A/IBOA (35/35/30) | 0.14 | 35 | | 35 | 30 | |

TABLE 5A

Curable Compositions Comprising Statistical (Meth)acrylic-based Copolymer

| Example | Syrup ID | Syrup wt. % | E3A wt. % | HDDA wt. % | HPPA wt. % | OM819 |
|---|---|---|---|---|---|---|
| E9 | SRP-3 | 39.11 | | 0.25 | | 0.21 |
| E10 | SRP-4 | 37.48 | | 0.20 | 3.75 | 0.20 |
| E11 | | 35.70 | 4.73 | 0.19 | 3.57 | 0.19 |

TABLE 5B

Curable Compositions Comprising Statistical (Meth)acrylic-based Copolymer

| Example | EPON 828 wt. % | EPON 1001 wt. % | Acclaim 2200 wt. % | GPTMS wt. % | Ar3S SbF6 phr | BMI-SbF6 phr |
|---|---|---|---|---|---|---|
| E9 | 31.52 | 15.75 | 12.14 | 1.03 | 3 | 10 |
| E10 | 30.45 | 15.21 | 11.73 | 0.99 | 3 | 10 |
| E11 | 29.01 | 14.49 | 11.17 | 0.95 | 3 | 10 |

Transfer tapes were made from the compositions of Table 6 by dissolving the materials in toluene at 40 wt. % total solids and coating onto RF22N release liner (from SKC Haas, Seoul, Korea, 2 mil) using a knife coater with a wet gap set to give a dried adhesive thickness of 4 mils (200 μm), when dried in oven at 120° C. for 15 minutes.

TABLE 6

Curable Compositions Comprising a (meth)acrylic-based multiblock copolymer or polyvinyl acetal film forming polymeric material

| | Resin Mixture - Weight Percent (wt. %) | | | | | | (phr) w.r.t 100 phr of Resin mixture | |
|---|---|---|---|---|---|---|---|---|
| | PVB | LA2330 | Acclaim A2200 | Epon 828 | Epon 1001F | Quintac 3620 | Ar3S PF6 | BMI PF6 |
| CE-D | | 50 | 12.5 | 22.5 | 10 | 5 | 2 | |
| E12 | | 50 | 12.5 | 22.5 | 10 | 5 | 2 | 10 |
| E13 | 45 | | 20 | 20 | 10 | 5 | 2 | 10 |

Transfer tapes (Examples 14 and 15) were prepared by first making preparative solutions of film forming polymeric material. Polymer pellets were massed into cylindrical, wide mouth, 4 oz glass bottles (FB02911942 from Fisher Scientific, Pittsburgh, PA). MEK was then added. The jar was capped and rolled for 16-72 hours until the resin was dissolved.

TABLE 7a

Preparative Solutions

| (pbw) | P-1 | P-2 |
|---|---|---|
| D540/3 | 13.2 | |
| V-2200B | | 23.4 |
| MEK | 86.8 | 76.6 |

Curable Composition Compounding: Additional components (EPON 828 through BMI PF6) were massed into cylindrical, wide mouth, 4 oz glass bottles. The preparative solution of the specified film forming polymeric material was added. If needed, additional solvent, matching that of the preparative solution, was added to reach the listed coating solution % solids. The jars were capped and rolled overnight, protected from ambient light exposure, until homogeneous. Jars were stored in the dark until coated.
Curable Composition Coating: The compounded solutions were knife coated onto siliconized PET release film and dried for 10 min at 100° C., to yield a dry thickness of 2.5-3 mil. After drying, another layer of siliconized PET was applied on the surface of the adhesive film. For Ex 15 only, the initial coating quality was poor (variable thickness and bubbles), so the coated material (tacky film) was folded on itself several times, placed between two new pieces of siliconized PET and pressed to ca. 3 mil film using a hydraulic press (Carver Inc, Wabash, IN) for 20 seconds with 5000 lb force, using 2 mil feeler gauges as spacers.

TABLE 7b

Curable Compositions

| (pbw) | E14 | E15 |
|---|---|---|
| D540/3 | 20 | |
| V-2200B | | 40 |
| EPON 828 | 70 | 40 |
| LHT240 | | 10 |
| Ar3S PF6 | 2 | 2 |
| BMI PF6 | 7.5 | 7.5 |
| Coating Solution wt. % solids | 74 | 76 |

Example E16

The uncured adhesive tape of E11 was hand laminated to both sides of L3P (Al/PET/Al) foil using a rubber roller, resulting in a multi-layer construction. The Overlap Shear and Tensile Push-out specimens were prepared as previously described, except a small tab of the L3P was left exposed outside the die-cut of the adhesive. For electrically induced debonding, one electrode was connected directly to the L3P layer via the exposed tab and one electrode connected to one substrate. The remainder of the test specimen preparation and testing were conducted the same as previously mentioned.

The following test results were generated using the previously described test methods except that the test samples were not heated and conditioned at room temperature for 5 days.

TABLE 8

Test Results.

| | Dynamic Shear, Al to Al Peak Stress (MPa) | Dynamic Shear, Al to Al % Reduction After 50 V for 5 min | Tensile Push Out | |
|---|---|---|---|---|
| Example | | | Peak Stress SS to SS (MPa) | % Reduction After 50 V for 5 min |
| E9 | 8.3 | | 17.4 | 72% |
| E10 | 4.3 | | 5.9 | 89% |
| E11 | 4.3 | | 8.3 | 98% |
| E12 | 2.6 | 82% | 4.3 | 70% |
| E13 | 4.1 | 46% | | |
| E14 | | | 3.1 | 66% |
| E15 | | | 3.9 | 67% |
| E16 | 2.8 | 96% | 1.8 | 88% |
| CE-D | 2.8 | | 3.1 | 20% |

| E17 | | wt. % |
|---|---|---|
| EPON 828 | | 50 |
| PPG-DGE | Poly(propylene glycol) diglycidyl ether (avg Mn ~380), from Millipore-Sigma (Burlington, MA) | 25 |
| BMI+ PF6− | | 20 |
| Ar3S+ PF6− | | 2 |
| R805 | Octylsilane-treated fumed silica obtained under the trade designation "Aerosil R 805" from Evonik (Parsippany, NJ) | 3 |

EPON 828 and R805 can be massed into a polypropylene Max40 cup (FlackTek, Inc., Landrum, SC). The cup can be closed with a polypropylene lid and mixed on a DAC150.1 FVZ-K SPEEDMIXER (FlackTek, Inc) for 60-120 seconds @ 3500 rpm until homogeneous. The remaining materials can be added, and the jar was mixed for 60 seconds at 3500 rpm. The sides of the jar can be scraped down before mixing an additional 60 seconds at 3500 rpm.

Bonded substrates can be prepared as previously described by applying the liquid adhesive to the substrate. The liquid adhesive may contain glass microspheres (SLGMS-2.5 140-150 um from Cospheric LLC, Somis, CA) as spacer beads for the controlling the adhesive thickness.

What is claimed is:

1. A curable composition comprising:
   a film forming polymeric material;
   an epoxy resin;
   a photoacid generator; and
   an ionic liquid that has a melting point less than 100 degrees Celsius and that has an anion selected from $SbF_6^-$, $PF_6^-$, or a mixture thereof.

2. The curable composition of claim 1 wherein the film forming polymeric material comprises a (meth)acrylic-based block copolymer, a statistical (meth)acrylic-based copolymer, or a combination thereof.

3. The curable composition of claim 1 wherein the curable composition comprises (meth)acrylic-based block copolymer, wherein the (meth)acrylic-based block copolymer is a triblock copolymer of formula A-B-A with the A blocks microphase separating from the B block, wherein the A block has a glass transition temperature equal to at least 50 degrees Celsius and the B block has a glass transition temperature equal to no greater than 20 degrees Celsius as measured using Dynamic Mechanical Analysis.

4. The curable composition of claim 2 wherein the curable composition comprises 10 to 40 weight percent of the (meth)acrylic-based block copolymer based on a total weight of resin components in the curable composition.

5. The curable composition of claim 2 wherein the curable composition comprises greater than 40 wt. % of the (meth)acrylic-based block copolymer based on a total weight of resin components in the curable composition.

6. The curable composition of claim 2 wherein the curable composition comprises statistical (meth)acrylic-based copolymer having a glass transition temperature no greater than 20 degrees Celsius when measured using Dynamic Mechanical Analysis.

7. The curable composition of claim 2 wherein the statistical (meth)acylate-based copolymer is crosslinked.

8. The curable composition of claim 2 wherein the curable composition contains 20 to 60 weight percent of the statistical (meth)acrylic-based copolymer based on a total weight of resin components in the curable composition.

9. The curable composition of claim 2 wherein the curable composition comprises greater than 60 weight percent up to 90% of the statistical (meth)acrylic-based copolymer based on a total weight of resin components in the curable composition.

10. The curable composition of claim 2 wherein the statistical (meth)acrylic-based copolymer comprises monomeric units derived from a (meth)acrylate macromer having a number average molecular weight of at least 300 Daltons, a polyol, or a combination thereof.

11. The curable composition of claim 1 wherein the statistical (meth)acrylic-based comprises at least 10 wt. % of polymerized units of a (meth)acrylate monomer having a Tg of at least 30° C.

12. The curable composition of claim 1 wherein the film forming polymeric material comprises polyurethane, polyester, polyvinyl acetal, a block copolymer of styrene and isoprene or butadiene, or a combination thereof.

13. The curable composition of claim 1 wherein the film forming polymeric material has a molecular weight greater than 50,000 Daltons.

14. The curable composition of claim 1 wherein the photoacid generator is an aryl-containing iodonium salt or a triaryl sulfonium salt.

15. The curable composition of claim 1 wherein the ionic liquid is an ammonium salt of Formula (VI), a sulfonium salt of Formula (VII), an imidazolium salt of Formula (VIII), a pyridinium salt of Formula (IX), or a pyrrolidinium salt of Formula (X)

(VI)

(VII)

(VIII)

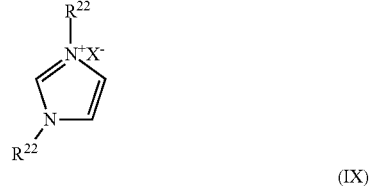

(IX)

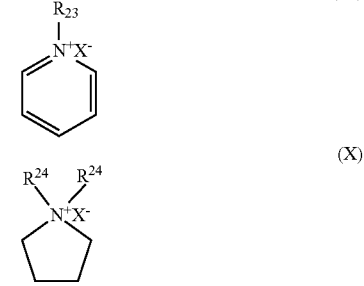

(X)

wherein
   each $R^{20}$, $R^{21}$, $R^{22}$, $R^{23}$, and $R^{24}$ is independently an alkyl, a hydroxy-substituted alkyl, or an ether-containing group of formula $-(R^{30}-O)_y-R^{31}$ wherein $R^{30}$ is an alkylene, $R^{31}$ is an alkyl, and y is an integer in a range of 1 to 10; and
   $X^-$ is $SbF_6^-$ or $PF_6^-$.

16. A first article comprising:
   a layer of a curable composition according to claim 1 wherein the curable composition has a first surface and a second surface opposite the first surface; and
   a first substrate or a first release liner positioned adjacent to a first surface of the first curable composition.

17. The first article of claim 16 wherein the layer of curable composition comprises an electrically conductive layer.

18. A second article comprising:
   a first substrate;
   a second substrate; and
   a layer of cured composition of claim 1 positioned between the first substrate and the second substrate, wherein the first substate is bonded to the second substrate with the first cured composition.

19. The second article of claim 18 wherein the first substrate, the second substrate, or both are electrically conductive or the layer of cured composition comprises an electrically conductive layer.

20. A method for separating the second article of claim 18 the comprising applying a direct current electric potential across the cured composition to separate the first substrate from the second substrate.

\* \* \* \* \*